(12) United States Patent
Rinne

(10) Patent No.: US 7,782,872 B2
(45) Date of Patent: *Aug. 24, 2010

(54) METHOD, APPARATUS, AND COMPUTER-READABLE MEDIUM FOR PROVIDING AN APPLICABLE QOS FOR DATA THAT HAS ACTUALLY EXPERIENCED A QOS DEGRADED FROM THAT REQUESTED

(76) Inventor: Mika Rinne, Kourakuja 3B 10, FIN-02320 Espoo (FI)

( * ) Notice: Subject to any disclaimer, the term of this patent is extended or adjusted under 35 U.S.C. 154(b) by 1426 days.

This patent is subject to a terminal disclaimer.

(21) Appl. No.: 11/039,369

(22) Filed: Jan. 18, 2005

(65) Prior Publication Data
US 2005/0185651 A1    Aug. 25, 2005

Related U.S. Application Data

(63) Continuation of application No. 09/648,781, filed on Aug. 28, 2000, now Pat. No. 6,845,100.

(51) Int. Cl.
H04L 12/56 (2006.01)
(52) U.S. Cl. ............ 370/395.43; 370/395.5; 370/395.52
(58) Field of Classification Search ........ 370/310.1, 370/310.2, 329, 395.42–43, 395.43, 322, 370/230, 230.1, 235, 238, 238.1, 395.2, 468, 370/395.21, 395.4, 395.1–2, 395.5, 395.51–52; 700/14, 33, 34, 306; 710/52, 53, 56; 711/109, 711/132
See application file for complete search history.

(56) References Cited

U.S. PATENT DOCUMENTS 5,793,976 A * 8/1998 Chen et al. ............ 709/224
5,926,458 A    7/1999 Yin
6,041,053 A    3/2000 Douceur et al.
6,104,700 A    8/2000 Haddock et al.
6,363,053 B1 * 3/2002 Schuster et al. ............ 370/230
6,449,255 B1   9/2002 Waclawsky (Continued)

FOREIGN PATENT DOCUMENTS
DE    19907085    4/2000

(Continued)

OTHER PUBLICATIONS

F. Wilder "A Guide to the TCP/IP Protocol Suite", 2$^{nd}$ Ed. 1998 Artech House/Boston, pp. 155-162.

(Continued)

*Primary Examiner*—Pankaj Kumar
*Assistant Examiner*—Mark A Mais

(57) ABSTRACT

Data is structured with information indicative of time-related, bandwidth-related, or class-related quality-of-service (QoS) required for sending the data so that a receiving terminal or any network element processing the data in transit over a network is able to determine whether the required quality-of-service has actually been uniformly experienced by the data and, in case the quality-of-service is degraded in any section of the network, the receiving terminal or the network element is able to cause the network to either uniformly accord to the data a degraded quality-of-service corresponding to that actually experienced or to actually uniformly provide the required quality-of-service between the sending and receiving terminals by improving the processing of the data by the network element or elements. A corresponding method, apparatus, system and computer programs are shown.

44 Claims, 14 Drawing Sheets

U.S. PATENT DOCUMENTS

| | | | |
|---|---|---|---|
| 6,563,793 | B1 | 5/2003 | Golden |
| 6,594,246 | B1 | 7/2003 | Jorgensen |
| 6,608,832 | B2 * | 8/2003 | Forslow .................. 370/353 |
| 6,842,615 | B2 * | 1/2005 | Angin ................... 455/432.1 |
| 6,947,750 | B2 * | 9/2005 | Kakani et al. ........... 455/452.2 |
| 6,970,430 | B2 * | 11/2005 | Guven et al. ............ 370/252 |
| 7,024,202 | B2 * | 4/2006 | Besset-Bathias et al. . 455/452.2 |
| 7,088,677 | B1 * | 8/2006 | Burst, Jr. ............... 370/229 |
| 7,263,063 | B2 * | 8/2007 | Sastry et al. ............ 370/235 |
| 7,327,729 | B2 * | 2/2008 | Kawaguchi et al. ....... 370/389 |
| 7,333,435 | B2 * | 2/2008 | Gerkis .................. 370/235 |
| 7,668,176 | B2 * | 2/2010 | Chuah ................. 370/395.42 |
| 2001/0033581 | A1 | 10/2001 | Kawarai et al. |

OTHER PUBLICATIONS

3G TS 25, 302 v 3.4.0 (Mar. 2000), $3^{rd}$ Generation Partnership Project; Technical Specification Group Radio Access Network; Services provided by the Physical Layer (Release 1999) (3GPP).

3G TS 25.401 v3.2.0 (Mar. 2000), $3^{rd}$ Generation Partnership Project; Technical Specification Group Radio Access Network; UTRAN Overall Description (Release 1999) (3GPP).

3G TS 25 322 v3.2.0 (Mar. 2000), $3^{rd}$ Generation Partnership Project; Technical Specification Group Radio Access Network; RLC Protocol Specification (Release 1999) (3GPP).

"Implementation of Differentiated Services over ATM" by T. Braun, et al, Proceedings of the IEEE Conference 2000 on High Performance Switching and Routing, Heidelberg, Germany, Jun. 26-29, 2000, pp. 317-322.

* cited by examiner

UTRAN  UMTS TERRESTRIAL RADIO ACCESS NETWORK
CN     CORE NETWORK
UE     USER EQUIPMENT

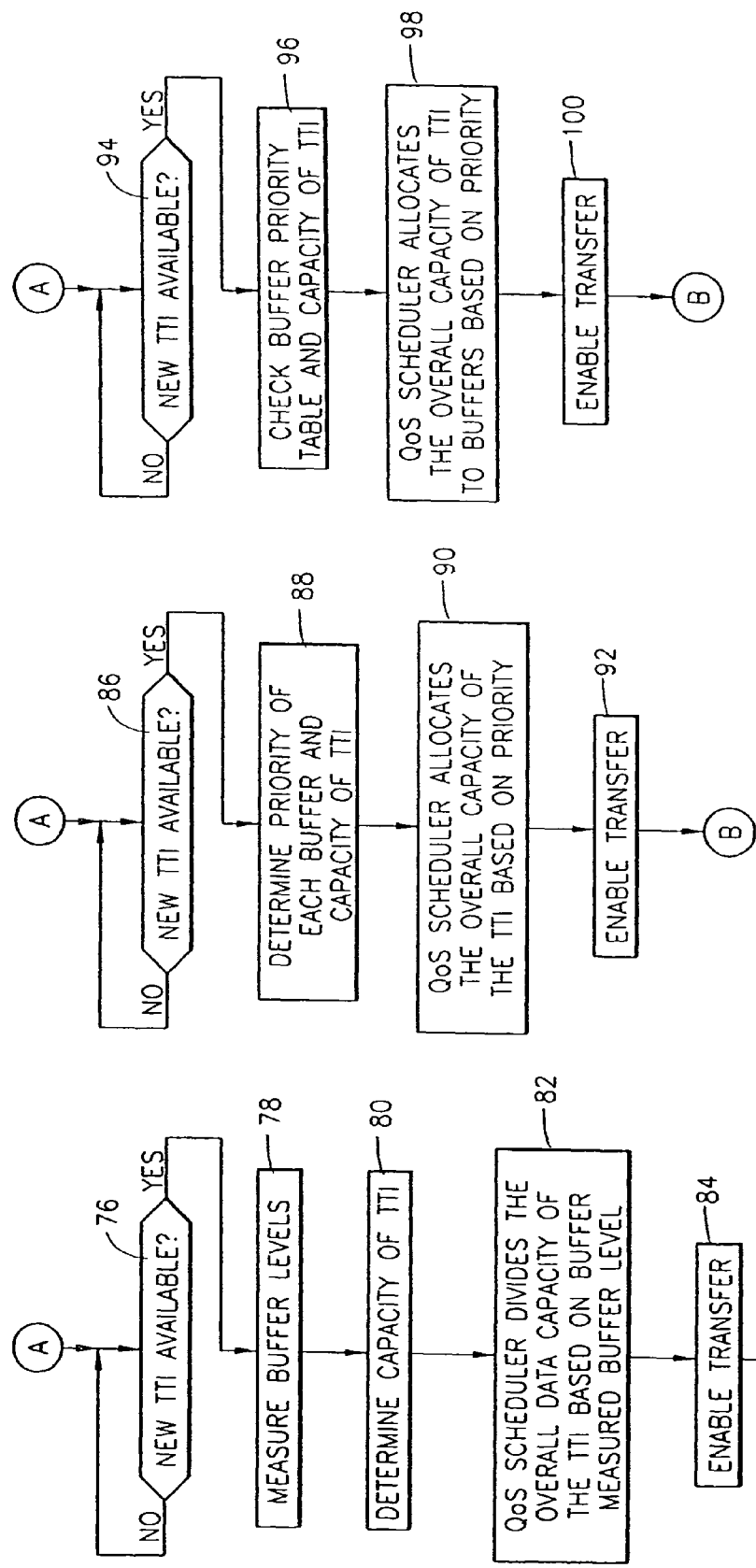

METHOD, APPARATUS, AND COMPUTER-READABLE MEDIUM FOR PROVIDING AN APPLICABLE QOS FOR DATA THAT HAS ACTUALLY EXPERIENCED A QOS DEGRADED FROM THAT REQUESTED

This application is a continuation of application Ser. No. 09/648,781 filed on Aug. 28, 2000, now U.S. Pat. No. 6,845,100.

BACKGROUND OF THE INVENTION

1. Technical Field

The invention relates to Quality of Service (QoS) mechanisms, particularly for wireless transmission but also relates to the detection and treatment of degraded QoS across any kind of network boundary.

2. Discussion of Related Art

The current solutions for packet traffic in the wireless radio link do not support mechanisms for guaranteed QoS.

There are new QoS mechanisms under development for application in fixed network routers. However, the function of radio network elements, i.e., the radio network controller and the user equipment is significantly different from those of a router. Typically, a router handles multiple input streams and provides multiple outputs streams extremely fast. The packets are delivered to the next network node depending on the destination address with the help of routing tables.

When packets arrive in a radio network controller, they are not routed based on the IP address anymore, but using the radio network specific user equipment (UE) addresses. The packets can be delivered through different transmission channels called dedicated channels, common channels or shared channels. The essential difference as compared to a fixed network is that the traffic shares common radio resources. The radio resource is scarce and changes dynamically due to changes in the traffic load, but also due to the radio characteristics. The radio network subsystem (RNS) is characterized in that it can control the radio resource dynamically and share it in a fair manner or close to optimal manner. The RNS is also characterized in that it is planned and dimensioned to provide coverage and capacity over a certain service area and targeted to satisfy the subscribers' needs. The capacity and coverage depend on the location, mobility and traffic type of the UE, but also it depends on the location, mobility and traffic type of the other UEs in the same RNS.

The problem is simply that there is no support for satisfying different QoS requirements over the air interface. Actually there is traditionally not even QoS mechanisms for the fixed network. However, as suggested above, recent effort has resulted in a number of QoS mechanisms for the internet protocol (IP) traffic in the fixed network. The field is still more or less open to guarantee the QoS over the air interface. Only the most simple and traditional means are known as giving different requirements for the bearers like the minimum guaranteed bit-rate requirement, maximum allowed service data unit (SDU) size and assigning each bearer a priority.

DISCLOSURE OF INVENTION

An object of the present invention is to provide QoS mechanisms for wireless transmission.

Another object is to provide for the detection and treatment of degraded QoS across any kind of network boundary.

According to a first aspect of the invention, a method for use in a wireless network, comprises the steps of classifying packets destined for various bearers of various mobile terminals according to differing classes, storing said classified packets according to said differing classes and according to said various bearers of various destination mobile terminals, scheduling some or all of said stored packets for possible transmission according to said various bearers of various destination mobile terminals during a cycle of a packet scheduler, scheduling some or all of said stored packets that have been scheduled for possible transmission for actual transmission according to said differing classes, and transmitting said stored packets scheduled for actual transmission during transmission time intervals occurring during said cycle of said packet scheduler.

Further according to the first aspect of the invention, a method wherein said step of scheduling some or all of said stored packets that have been scheduled for possible transmission for actual transmission according to said differing classes comprises the step of scheduling equal amounts of data for transfer from said different classes.

Still further according to the first aspect of the invention, a method wherein said step of scheduling some or all of said stored packets that have been scheduled for possible transmission for actual transmission according to said differing classes comprises the steps of determining transmission capacity of a transmission time interval and dividing said capacity into equal portions, one portion for each of said differing classes.

Further still according to the first aspect of the invention, a method wherein said step of scheduling some or all of said stored packets that have been scheduled for possible transmission for actual transmission according to said differing classes, comprises the steps of determining service types of said differing classes, determining transmission capacity of a transmission time interval, and allocating the overall capacity of the transmission time interval based on said service type.

Still further according to the first aspect of the invention, a method wherein said step of scheduling some or all of said stored packets that have been scheduled for possible transmission for actual transmission according to said differing classes, comprises the steps of measuring amounts of packets stored according to said differing classes, determining a capacity of a transmission time interval, and dividing the capacity of the transmission time interval according to said measured buffer levels.

Further in accordance with the first aspect of the invention, a method wherein said step of scheduling some or all of said stored packets that have been scheduled for possible transmission for actual transmission according to said differing classes, further comprises the steps of determining priorities of said packets stored according to said differing classes, determining transmission capacity of a transmission time interval, and allocating said capacity based on said priorities.

Still further in accordance with the first aspect of the invention, a method wherein said step of scheduling some or all of said stored packets that have been scheduled for possible transmission for actual transmission according to said differing classes, further comprises the steps of determining from a priority table priorities of said packets stored according to said differing classes, determining a capacity of a transmission time interval, and allocating said capacity based on said priorities.

Further according to the first aspect of the invention, a method wherein said differing classes are indicative of quality-of-service requested for said packets in transit outside said wireless network before arriving at said wireless network, comprises the steps of determining if said packets actually received said requested quality-of-service in transit outside said wireless network, and wherein said step of classifying comprises the step of classifying said packets according to said requested quality-of-service if said packets actually received the requested quality-of-service in transit outside said wireless network, and otherwise classifying said packets according to a quality of service actually experienced by said packets in transit outside said wireless network.

According to a second aspect of the invention, an apparatus for use in a wireless network, comprising a packet classifier for classifying packets destined for various bearers of various mobile terminals according to differing classes, packet storage medium for storing said classified packets according to said differing classes and according to said various bearers of various destination mobile terminals, packet scheduler for scheduling some or all of said stored packets for possible transmission according to said various bearers of various destination mobile terminals during a cycle of said packet scheduler, quality-of-service (QoS) scheduler for scheduling some or all of said stored packets that have been scheduled for possible transmission for actual transmission according to said differing classes, and transmitter for transmitting some or all of said packets scheduled for actual transmission during transmission time intervals occurring during said cycle of said packet scheduler.

Further according to the second aspect of the invention, an apparatus wherein said QoS scheduler comprises means for scheduling equal amounts of data for transfer from said different classes.

Still further according to the second aspect of the invention, an apparatus wherein said QoS scheduler comprises means for determining transmission capacity of a transmission time interval and means for dividing said capacity into equal portions, one portion for each of said differing classes.

Further still according to the second aspect of the invention, an apparatus wherein said QoS scheduler comprises means for determining service types of said differing classes, means for determining capacity of a transmission time interval, and means for allocating the overall capacity of the transmission time interval based on said service types.

Yet further according to the second aspect of the invention, an apparatus wherein said QoS scheduler comprises means for measuring amounts of packets stored according to said differing classes, means for determining a capacity of a transmission time interval, and means for dividing the capacity of the transmission time interval according to said measured buffer levels.

Further in accordance with the second aspect of the invention, an apparatus wherein said QoS scheduler comprises means for determining priorities of said packets stored according to said differing classes, means for determining capacity of a transmission time interval, and means for allocating said capacity based on said priorities.

Still further in accordance with the second aspect of the invention, an apparatus wherein said QoS scheduler comprises means for determining from a priority table priorities of said packets stored according to said differing classes, means for determining a capacity of a transmission time interval, and means for allocating said capacity based on said priorities.

Further still in accordance with the second aspect of the invention, an apparatus wherein said differing classes are indicative of quality-of-service requested for said packets in transit outside said wireless network before arriving at said wireless network, said apparatus further comprises means for determining if said packets actually received said requested quality-of-service in transit outside said wireless network, and wherein said packet classifier comprises means for classifying said packets according to said requested quality-of-service if said packets actually received the requested quality-of-service in transit outside said wireless network, and otherwise for classifying said packets according to a quality of service actually experienced by said packets in transit outside said wireless network.

According to a third aspect of the invention, a method comprises the steps of receiving a packet in a first network from a second network, said packet having information relating to a quality-of-service requested for said packet, determining if said packet actually requires said requested quality-of-service, and classifying said packet according to said requested quality-of-service and providing said packet with said requested quality-of-service over said first network, otherwise classifying said packet according to a quality-of-service actually experienced by said packet over said second network and providing said packet with a quality-of-service corresponding to said quality-of-service actually experienced by said packet over said second network.

Further according to the third aspect of the invention, a method comprises the step of notifying a sender of said packet of said quality-of-service actually experienced by said packet over said second network.

According to a fourth aspect of the invention, an apparatus for use in a wireless network, comprises means for receiving a packet in a first network from a second network, said packet having information relating to a quality-of-service requested for said packet, means for determining if said packet actually requires said requested quality-of-service, and means for classifying said packet according to said requested quality-of-service and providing said packet with said requested quality-of-service over said first network, otherwise classifying said packet according to a quality-of-service actually experienced by said packet over said second network and providing said packet with a quality-of-service corresponding to said quality-of-service actually experienced by said packet over said second network.

Further according to the fourth aspect of the invention, an apparatus further comprises means for notifying a sender of said packet of said quality of service actually experienced by said packet over said second network.

SUMMARY

The invention covers L2 QoS methods for packet traffic, both the UE and the RNS implementing the described QoS methods. It also covers the signaling between the UE and the RNS to select one or more of the described means for use in QoS satisfaction. It further covers the labels, tags, QoS classes and flow labels that are used as QoS mechanisms in the RNS and the UE and signaled over the air interface.

These new schemes are characterized in that they are available for QoS guarantee, but they are also characterized in that they are available for tuning the IP performance over the wireless interface. QoS for packet traffic is a radio performance issue in terms of throughput, delay and delay variation.

Impact on Current Developments

The impact on current developments will be three-fold. If a dynamic QoS attribute is to be applied during a bearer lifetime between the instances of bearer reconfiguration, a new message needs to be delivered between the peer entities. This message is dynamic priority or a like QoS differentiator, which would indicate relative importance of the traffic flows.

The SGSN/router, where the IP headers are known and PDP context is opened, should deliver the QoS attribute fields for layer 2 radio interface. These fields are traffic class applied for QoS of the differentiated services and flow label potentially applied for other QoS purposes. No other QoS mechanisms are seen essential for the fixed network IP transport in the IP packet header. Novelty is that these labels will be delivered to the radio interface layer 2, which can apply any scheduling or dynamic prioritization scheme based on the values of these fields.

The third impact is to apply the "hop-limit" field in a novel way. Typically this IP packet field is applied to enforce maximum packet lifetime to discard obsolete packets. The novel way is to use this field for the air interface latency tagging described below.

Advantages

Making QoS differentiation for packets over the air interface enables the end-to-end quality of service, which is considered very essential for the future networks. QoS mechanisms make possible to better optimize the air interface and to solve the arising congestion problems in the best possible way. It is a clear benefit to separate the network congestion problem solving from the radio network caused packet loss problem solving.

BRIEF DESCRIPTION OF THE DRAWINGS

FIG. 9D shows the QoS scheduler dividing the overall data capacity of the TTI based on measured buffer level, according to the present invention.

FIG. 9E shows the QoS scheduler allocating the overall capacity of the TTI based on buffer priority, according to the present invention.

FIG. 9F shows the QoS scheduler allocating the overall capacity of the TTI to buffers based on buffer priority, according to the present invention.

BEST MODE FOR CARRYING OUT THE INVENTION

The air interface is described for 3G WCDMA. The disclosed apparatus and methods would also apply to GSM/GPRS and WLAN, but it should be realized that then the involved network elements would be different from those of WCDMA.

Figure 1:
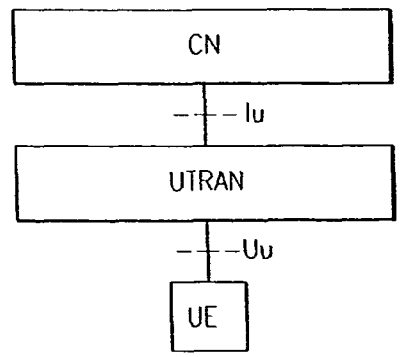
FIG. 1 shows a Universal Mobile Telecommunications System (UMTS) architecture proposed by the Third Generation Partnership Project (3GPP).

FIG. 1 shows a simplified UMTS (Universal Mobile Telecommunications System) architecture with external reference points and interfaces to the UTRAN (UMTS Terrestrial Radio Access Network), according to FIG. 1 of "Third Generation Partnership Project; Technical Specification Group Radio Access Network; UTRAN Overall Description, 3G TS 25.401 v.3.2.0 (2000-03)". The protocols over Uu and Iu interfaces are divided into user plane protocol structures and control plane protocol structures. The user plane protocols implement the actual radio access bearer service, i.e., carrying user data through the access stratum. The control plane protocols control the radio access bearers and the connection between the UE and the network from different aspects (including requesting the service, controlling different transmission resources, handover and streamlining, etc.).

Figure 2:
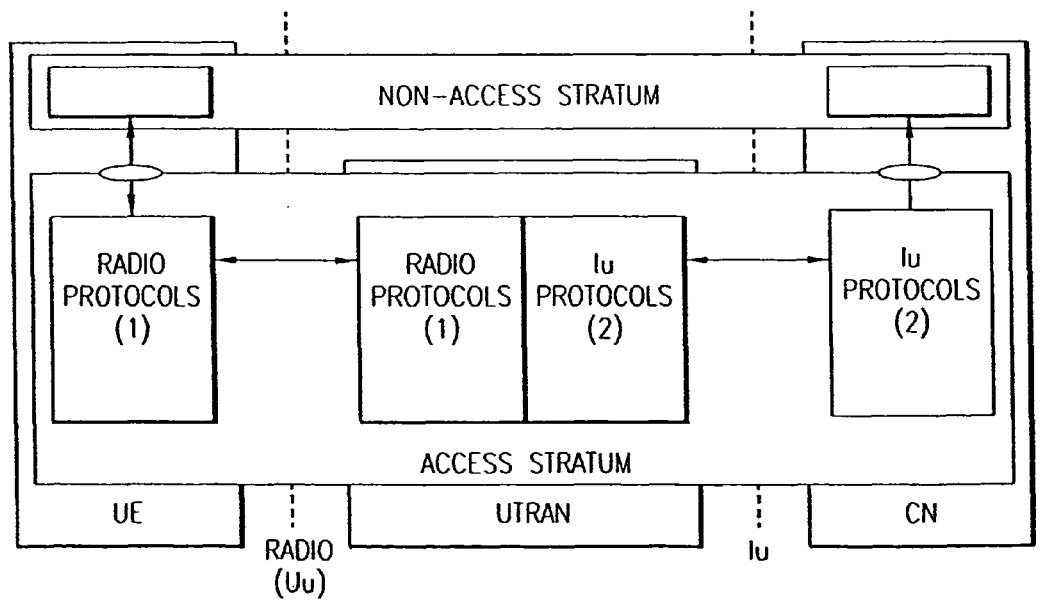
FIG. 2 shows Iu and Uu user plane for the 3GPP.

FIG. 2 illustrates the Iu and Uu user plane, wherein the radio access bearer service is offered from SAP (Service Access Point) to SAP by the access stratum. The radio interface (Uu) protocols are defined in documents 3G TS 25.2xx and TS 25.3xx. The Iu interface protocols are defined in documents 3G TS 25.41x. The present invention discloses that non-access stratum information in packet traffic, particularly the IPv6 packet fields of Traffic Class and Flow Labels are signaled on a packet-by-packet basis to the access stratum protocol layers for QoS scheduling. IPv6 is discussed in detail at pages 155-162 of the second edition of "A Guide to the TCP/IP Protocol Suite", by Floyd Wilder, published by Artech House, Inc., 1998. The IPv6 header format includes an indication of the IP version and priority (delivery order of packets) in the first octet, and a flow label in the next three octets indicating the type of service handling. The payload length is indicated in the next octet, etc.

Figure 3:
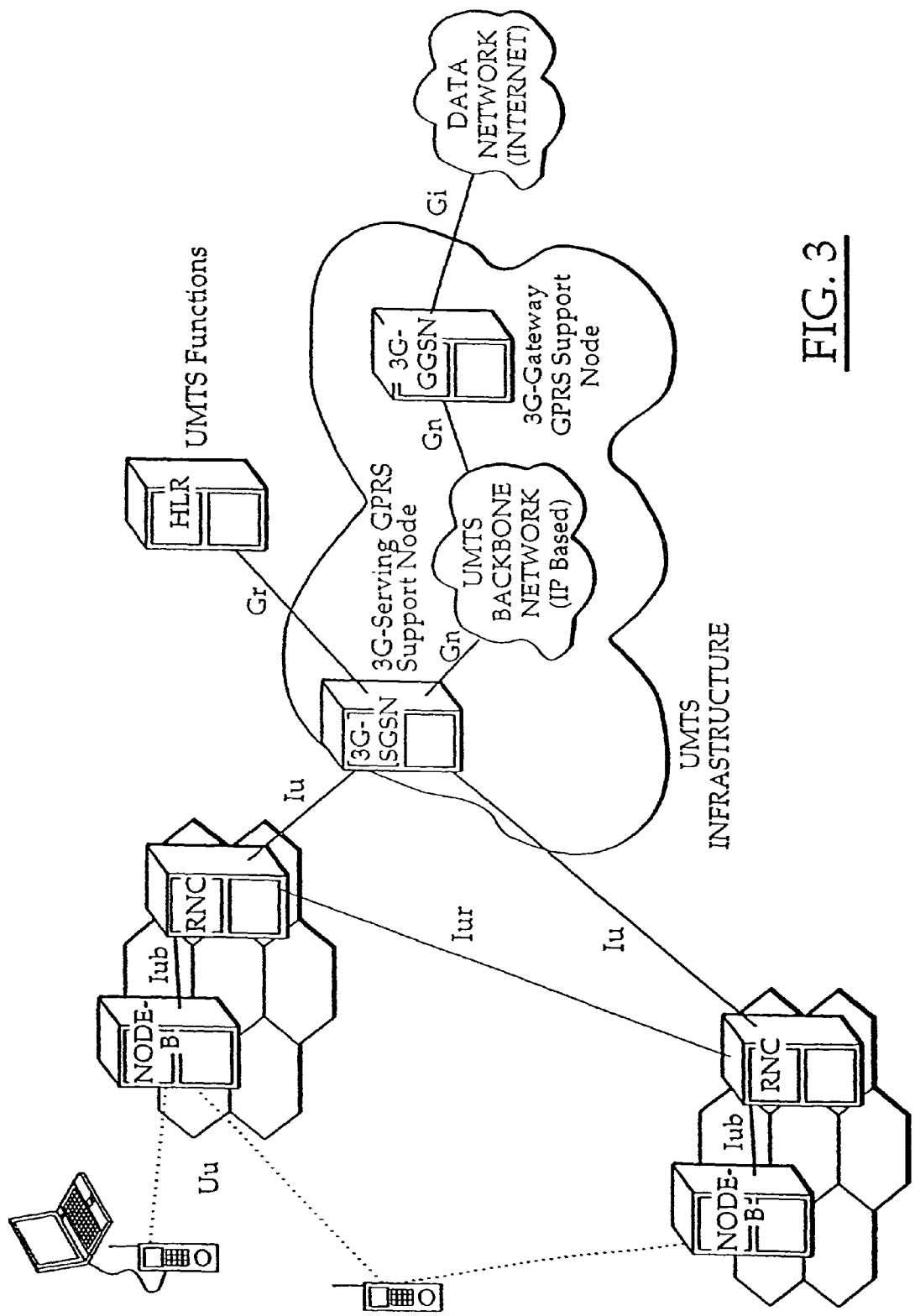
FIG. 3 shows a more detailed representation of the proposed UMTS packet network architecture.

FIG. 3 shows the UTRAN architecture as described in Section 6 of 3G TS 25.401 v.3.2.0 (2000-03) as well as details of the core network. The UTRAN consists of a set of Radio Network Subsystems (RNS) connected to the core network through Iu interfaces. An RNS consists of a Radio Network Controller (RNC) and one or more Node Bs. A Node B is connected to the RNC through an Iub interface. A Node B can support FDD (frequency division duplex) mode, TDD (time division duplex) mode or dual-mode operations. Inside the UTRAN, the RNCs of the Radio Network Subsystems can be interconnected together through an Iur interface. Iu(s) and Iur are logical interfaces. Iur can be conveyed over direct physical connection between RNCs or virtual networks using any suitable transport network. Each RNS is responsible for the resources of its set of cells. For each connection between User Equipment (UE) and the UTRAN, one RNS is the serving RNS (SRNS). When required, Drift RNSs support the Serving RNS by providing radio resources. The role of an RNS (serving or drift) is on a per-connection basis between a UE and the UTRAN.

The UMTS packet network architecture of FIG. 3 will be highly similar to GPRS. However, the naming of some elements and interfaces has been changed from GPRS. The UMTS packet network consists of the following network elements:

- 3G-SGSN: it will be the third generation version of the serving GPRS support node (SGSN).
- 3G-GGSN: it will be the third generation version of the gateway GPRS support node (GGSN).
- HLR: it will be the GSM home location register (HLR) with some updates.
- Node B: it will correspond to base transceiver station (BTS) in GSM.
- RNC (Radio Network Controller): it will correspond to base station controller (BSC) in GSM.

The core network (CN) part of the packet-switched side will consist of 3G-SGSN, 3G-GGSN and HLR elements. The packet core network will include also the backbone network for connecting core network elements 3G-SGSN and 3G-GGSN together.

As mentioned above, Node B and RNC will comprise the radio access network (RAN) part of the UMTS network. RAN will correspond to GSM's BSS (Base Station Subsystem). The responsibility of RAN is the handling of all radio-specific functions, e.g., radio channel ciphering, power control, radio bearer connection setup and release. The basic separation between elements will be that Node B will handle the physical layer functions, and RNC will handle the management functions. However, the separation might be slightly different than in GSM. It will be evident to anyone of skill in the art that all of the functions carried out within the referenced architecture as described below may be carried out by hardware, software, or some combination of hardware and software. If carried out in whole or in part by software, such comprises program code stored on a non-transitory computer readable medium for execution by a signal processor.

Figure 4A:
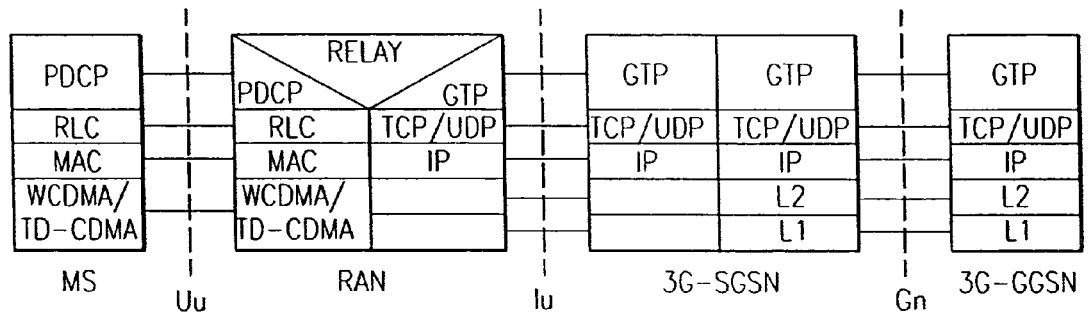
FIG. 4A shows a UMTS user plane protocol stack.
Figure 4B:
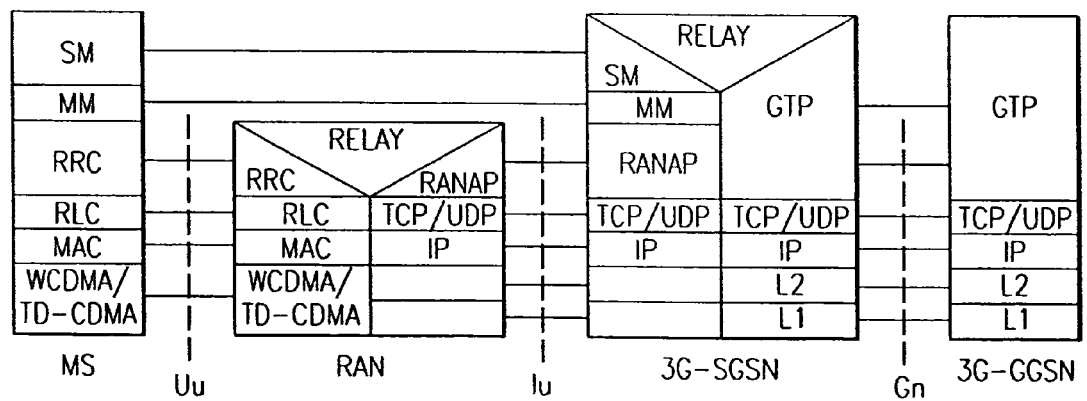
FIG. 4B shows a UMTS control plane protocol stack.

FIG. 4A shows the UMTS user plane protocol stack. A corresponding UMTS control plane protocol stack is shown in FIG. 4B. In the UMTS radio interface (Uu) each radio bearer will have its own Radio Link Control (RLC) entity. Using this approach, the QoS provisioning is more efficient. The QoS related multiplexing is a task set for the Medium Access Control (MAC) layer and layer 1. In the downlink, RLC will handle the RNC-MS part. Between RNC and the core network, there is no flow control. But this is not a much worse situation than in GPRS, because GPRS has no flow control inside the core network (between GGSM and SGSM). Adequate data transfer between 3G GGSM and RNC relies on large enough buffers, traffic policing in 3G GGSM and end-to-end flow control, e.g., Transmission Control Protocol (TCP).

Figure 5:
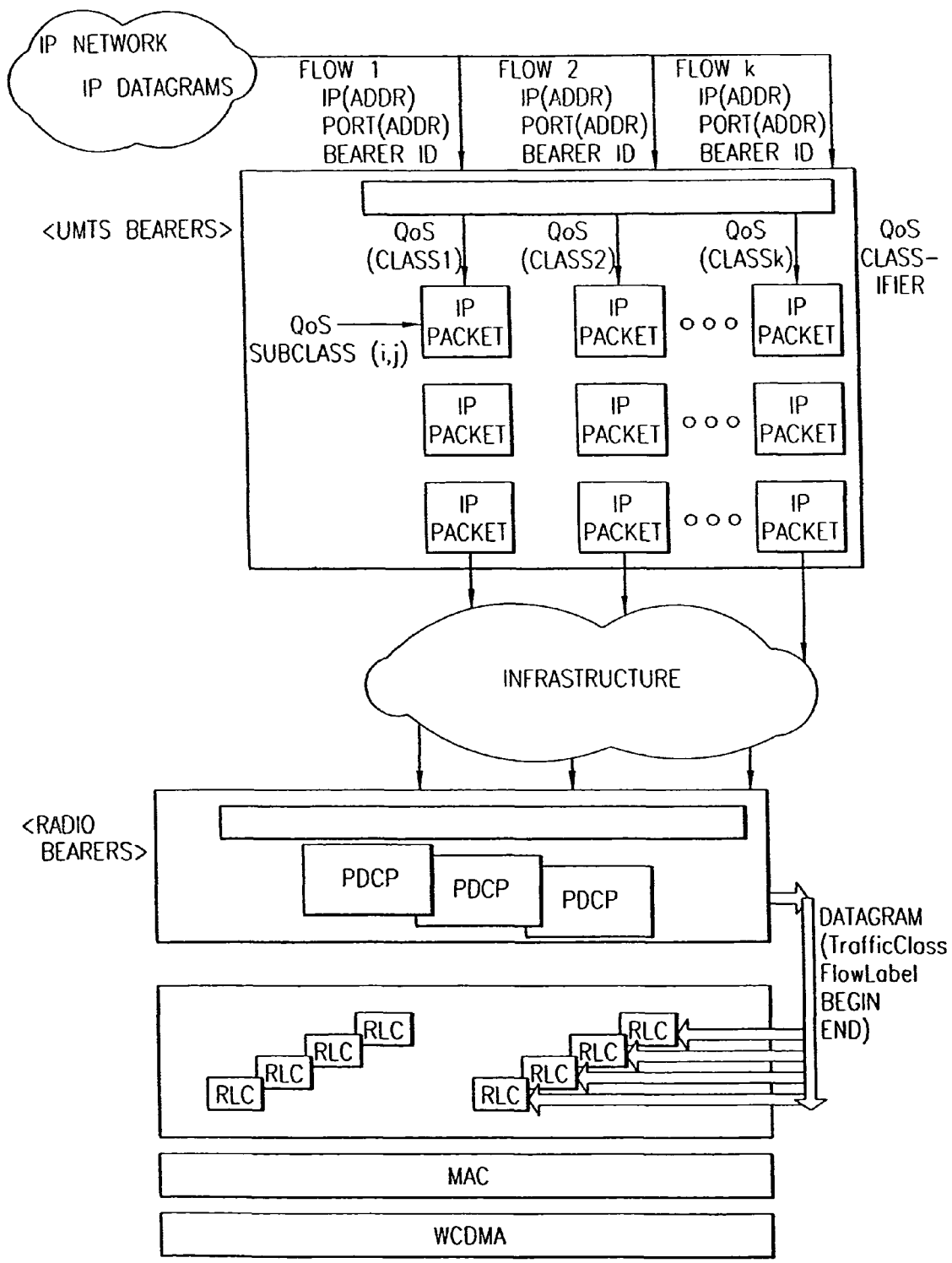
FIG. 5 shows QoS mapping of IP packets to the radio interface.

FIG. 4B shows the UMTS control plane protocol stack with the radio resource control layer above the RLC/MAC layer 2. FIG. 5 shows QoS mapping of IP packets to the radio interface. IP packets arriving from an IP network are shown comprising several different flows. A flow is a combination of the source and destination host addresses, as well as the source and destination ports. In the IPv4 case, the flow can be so defined. For IPV6, the flow label field can be used in addition to the port numbers. For UMTS, flows are used to map packets to the right PDP context, i.e., mapping to the PDP context is made on a flow basis. Multiple PDP contexts can exist and the set of Qos attributes negotiated for and utilized by one PDP context is referred to as a QoS profile. There can be several PDP contexts with the different kinds of QoS profiles using the same PDP address. FIG. 5 shows several such flows being provided to a QoS classifier, where they are classified according to differing QoS classes. The differing classes may differ in classes of quality of service, classes of latency, classes of throughput, classes of delay, classes of bandwidth, etc. QoS class indicates to which category of QoS the flow of packets belong. This can be indicated, e.g., by a range of the traffic class indicators, such as:

traffic class-protocol field [0 ... 255] is divided to classes.
QoS Class 1 [10 ... 14]
QoS Class 2 [15 ... 19]
QoS Class 3 [20 ... 39]
Qos Class 4 [40 ... 127]
Qos Class 5 [128 ... 255]

Still under each flow of packets belonging to a given QoS class, there can be some QoS differentiation on a packet-by-packet basis, such as:

QoS Subclass (i,j), e.g., (2, 18) is typically QoS Class 2, with traffic class value 18. However, when packets appear with QoS Class 2 with traffic class value 15, it will get higher scheduling privileges in the Radio Interface Layer 2.

The QoS classification process may take place, for instance, in the 3G GGSN of FIG. 3. Subsequently, the so-classified IP packets are provided to other portions of the UMTS infrastructure, as generally indicated in FIG. 5. Ultimately, the various QoS classified packets are provided to a PDCP (packet data convergence protocol) layer at the RAN, where the packets are stored in various RLC buffers corresponding to the various classes or subclasses of the QoS classified packets. After that, the packets are transferred by the MAC layer to the physical layer for transmission over the radio interface Uu of FIG. 3.

The invention is concerned with showing how to carry out RLC/MAC scheduling and triggering based on the signaled information about traffic class and/or flow label protocol fields in each packet.

As mentioned, for the provision of end-to-end QoS capability in a mobile network, the methods applied in the fixed core network routers are not sufficient, and novel methods are disclosed herein for the packet delivery over the radio interface, so that the end-to-end QoS requirements are met.

Figure 6:
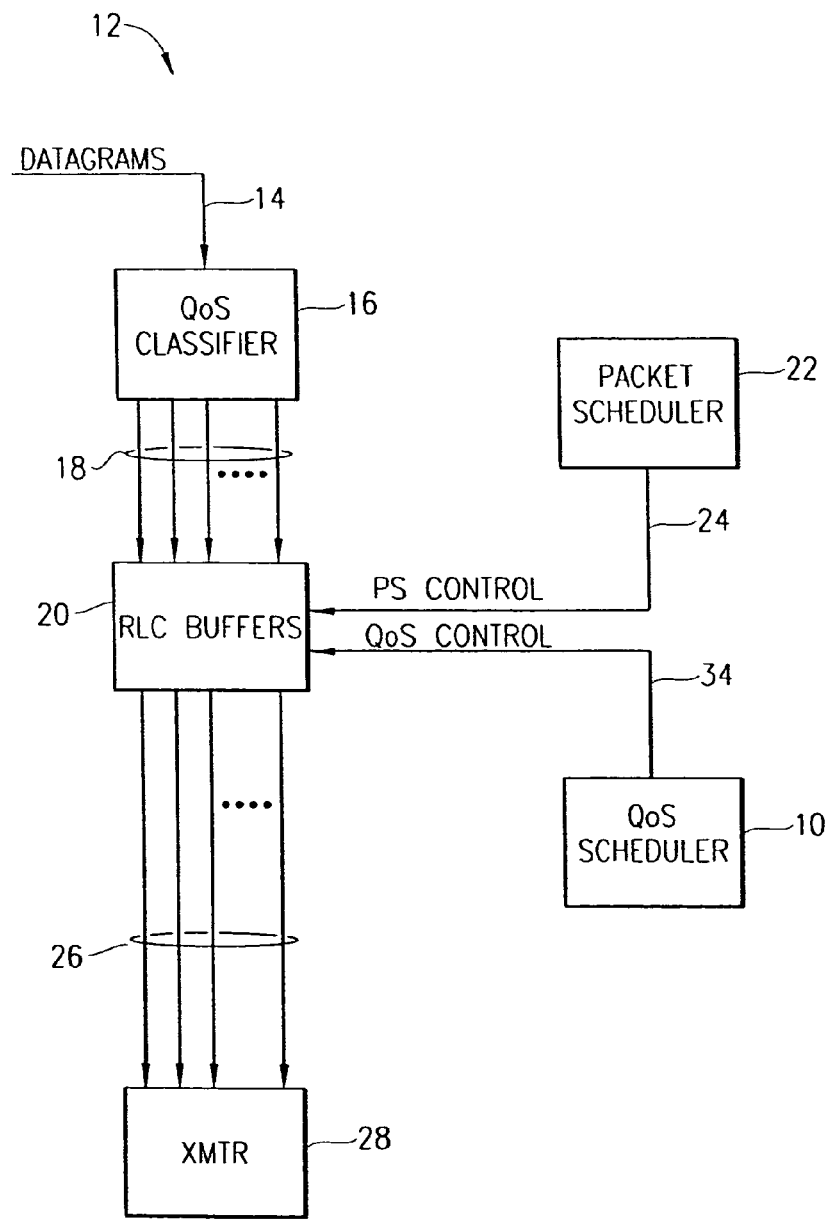
FIG. 6 shows a QoS scheduler, according to the present invention, in combination with a packet scheduler, which together with the QoS classifier provide QoS mechanisms for wireless transmission, according to the present invention.

Referring now to FIG. 6, illustration is shown there of the inventive QoS scheduler 10, which may be used in conjunction with various other functional blocks and various layers in a combination 12 residing in both the UE and the RNS. The combination 12 includes a packet classifier 16, such as the QoS classifier of FIG. 5 which, in the case of the combination 12 residing in the UTRAN or CN, can be used to classify packets 14 destined for various bearers of various mobile terminals according to differing classes or can be used for classifying packets destined for bearers of a single mobile terminal according to differing classes. The so-classified packets are provided or caused to be provided by the QoS classifier 16 on a line 18 (which may comprise a plurality of lines) to various radio link control (RLC) buffers 20 (such as shown in FIG. 5) for storage therein, according to the differing classes and, if applicable, according to the various destination mobile terminals. A packet scheduler (PS) 22 is part of the Radio Resource Management (RRM) functionality of Radio Access Network (RAN). The PS functionality in RAN may be totally located in the Radio Network Controller (RNC) of FIG. 3.

The packet scheduler 22 provides one or more control signals on a line 24 to the RLC buffers 20 in order to schedule the possible transfer of packets from the RLC buffers on a line 26, which may be a plurality of lines, to a transport block assembler (not shown) for actual transfer to the air interface using a selected transport mechanism at the physical layer L1, as shown by a transmitter 28.

The present invention provides a QoS scheduler 10 that acts in conjunction with the packet scheduler 22 to further schedule packets that have already been scheduled by the packet scheduler 22 (for possible transmission) for actual transmission. It does this by means of one or more control signals on a line 34 to schedule release of selected packets from storage in the RLC buffers. It should be realized that the control signal or signals on the line 34 could instead be provided to the packet scheduler. In that case, the stored packets scheduled by the packet scheduler for possible transmission would only be released upon receiving a further control signal from the QoS scheduler, which would then be signaled to the RLC buffer or buffers 20 by the packet scheduler by the signal on the line 24.

The Packet Scheduler decides which Terminals are active during the next packet allocation period. The QoS scheduler triggers the RLC buffers for the selected terminals in the order of QoS classification. The bearers may have different Transport Format Sets (TFS) to support different transmission rates during a Transmission Time Interval (TTI) such as shown in FIG. 6 of 3G TS 25.302 v.3.3.0 (2000-1), "Services Provided by the Physical Layer", at Section 7. The Transmission Time Interval is defined as the inter-arrival time of Transport Block Sets and is equal to the periodicity at which a Transport Block Set is transferred by the physical layer on the radio interface. The Transport Format Set is a set of transport formats associated to a transport channel. Each transport format constitutes two parts, a dynamic part and a semi-static part. The semi-static parts of all transport formats are the same within a Transport Format Set. The attributes of the dynamic part make it possible to form an instantaneous bit rate on the transport channel by changing between each TTI either the transport block set size or both the transport block size and the transport block set size. The Transport Format (TF) is selected for every bearer from its own Transport Format Set (TFS). Within the Coded Composite Transport Channel (CCTrCh) of a terminal, the Transport Formats are restricted so that the TF selection doesn't exceed the limits of an allowed Transport Format Combination Set (TFCS). According to the invention, the TFs for every bearer are selected by the QoS scheduler inside the limits of a TFCS so that the best QoS provision for the terminal is achieved during every TTI period.

Figure 7:
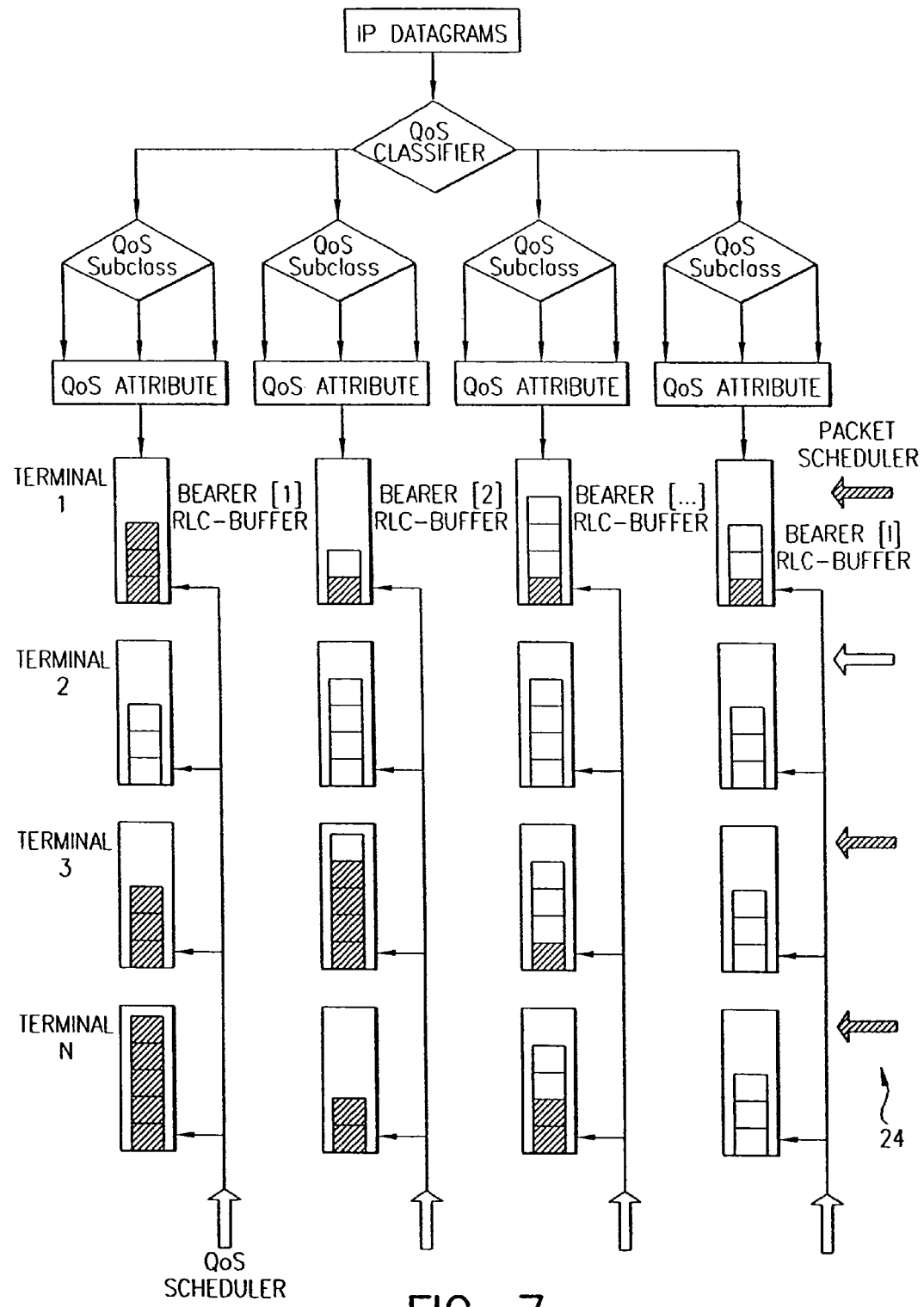
FIG. 7 shows IP packets arriving on the network side, where QoS class is analyzed and packets are directed to the correct quality context to be buffered in RLC buffers.

FIG. 7 illustrates a scheme about QoS scheduling, according to the invention on the network (either RNS or core network) side. The upper part of FIG. 7 corresponds to the QoS classifier of FIG. 5 as well as the QoS classifier 16 of FIG. 6, while the RLC-buffers for various terminals (1, 2, 3, . . . , N) correspond to the RLC buffers of FIGS. 5 and 6 as well. For instance, IP packets arrive to the 3G-GGSN or other edge-router, where its QoS class (among other things) is analyzed in a QoS classifier. The packet is directed to the correct quality context to be buffered in the RLC buffer after the network headers are removed or compressed. There are RLC buffers for every terminal for every bearer (at least in the acknowledged mode RLC that can provide improved quality for packet services). The RLC functionality for segmentation, numbering and PDU construction is defined in the specification 3G TS 25.322.

Signaling on line 24 from the RRC packet Scheduler (on the right in FIG. 7) has indicated (darkened arrows) which terminals (1, 3, . . . , N) are active during the next packet scheduling period of the PS 22. For these terminals there is capacity available and the QoS scheduler schedules transmission blocks for triggering by the physical layer every TTI period of time. The figure shows that all the RLC PDUs for all the active terminals are transmitted during the TTI for the first QoS class (the leftmost vertical stack of the RLC buffers). For terminal 1 it is required that the PDUs in flow 2, 3 and 4 all get at least one packet to the transmission, which means that for the current transmission capacity the two packets from flow 2 cannot be scheduled, even if it might have the highest demand. For terminal 3, the TFCS allows a larger number of transmission blocks and as its flow 2 has large values of TF available, a larger number of packets can be scheduled by the QoS scheduler from flow 2. However, as flow 3 favors at least one packet to be transmitted, only 4 blocks can be scheduled by the QoS scheduler instead of 5 that would be available. Flow 4 doesn't get a privilege at all during this TTI, but it may get it during the next TTI, if there is not enough higher privilege packets to transmit or if its privilege is raised for the next TTI. For terminal N the first flow is scheduled to the largest extent and the other flows are scheduled in sequential order to the largest extent. However, not more than 2 packets can be scheduled from flow 3 and no packets can be scheduled from flow 4, because there is no suitable TF selection available. For the next TTI the terminal N flow 4 will also get packets through, if there are enough radio resources available.

It should be noticed that the Transmission Block sets for every terminal are formed independently and they don't depend on the other terminals. The limits are caused by the common radio resources available and the maximum allowed TFCS of every terminal. If any of the bearers tend to achieve degraded quality, a bearer reconfiguration procedure should be carried out to increase the bearer capabilities.

Figure 8:
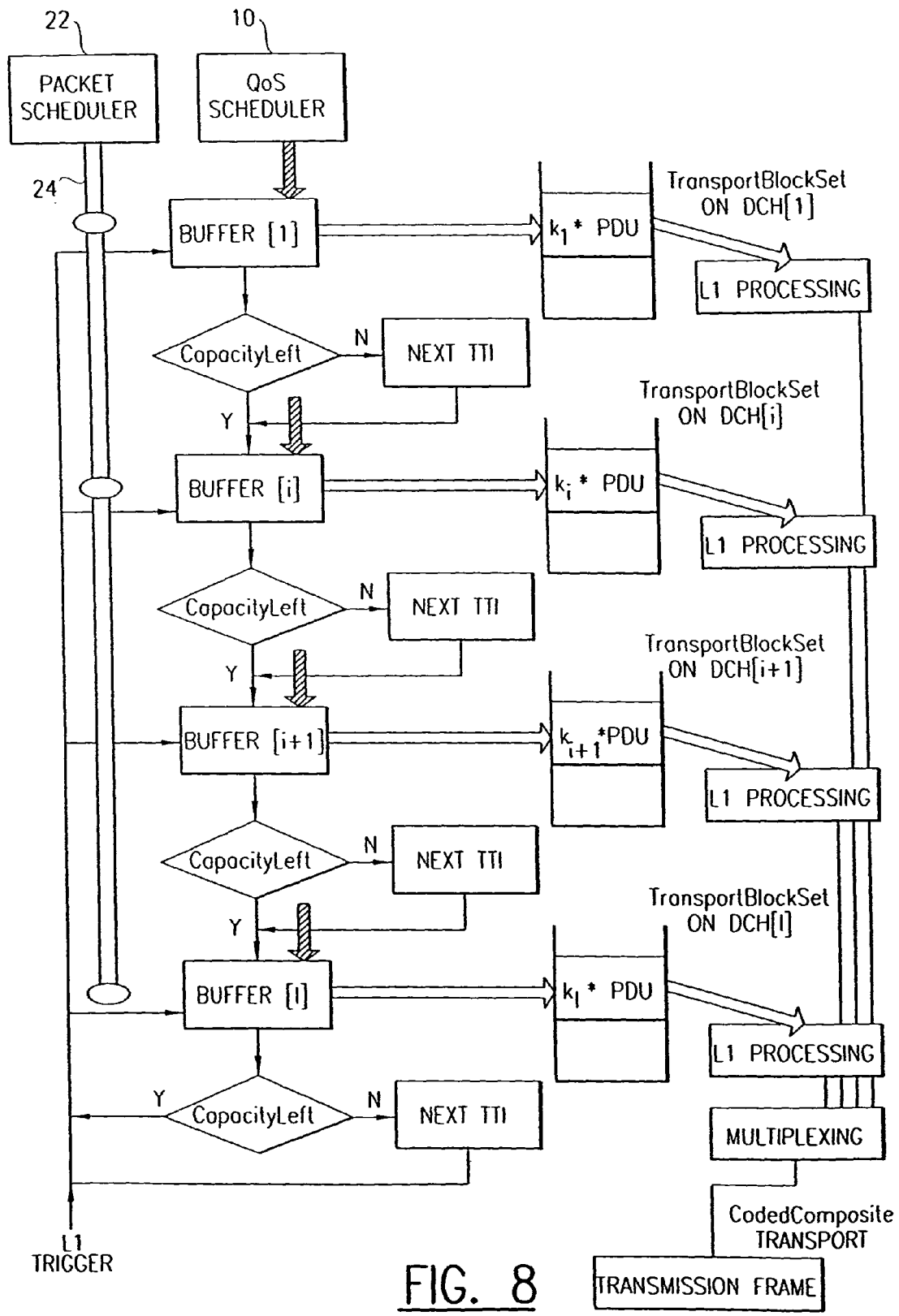
FIG. 8 shows scheduling and QoS triggering from the network side, but for a single terminal.

FIG. 8 shows the same concept as shown in FIG. 7 from a different perspective, i.e., from the perspective of a single terminal (user equipment (UE)). It is also possible for the packet scheduler to trigger selected buffers for different radio bearers, as shown by the packet scheduler 22 of FIG. 8 only scheduling the first two and the last, but not the third RLC buffer for the terminal.

The present invention contemplates the possibility of several different QoS mechanisms that may be carried out in the novel QoS scheduler. Examples of such mechanisms will now be set forth as QoS mechanisms 1 and 2, with one or more alternative ways of carrying out each mechanism described in conjunction with FIG. 8.

QoS Mechanism 1

Depending on the QoS class the MAC triggers the RLC data buffers once per transmission time interval (TTI). The amount of data triggered from the buffers is determined by the selected transport format of the transport format set for each transport channel. The QoS class is known either by flow labeling in the IP packet, by bandwidth manager parameters or is negotiated end-to-end by the RSVP protocol.

Figure 9:
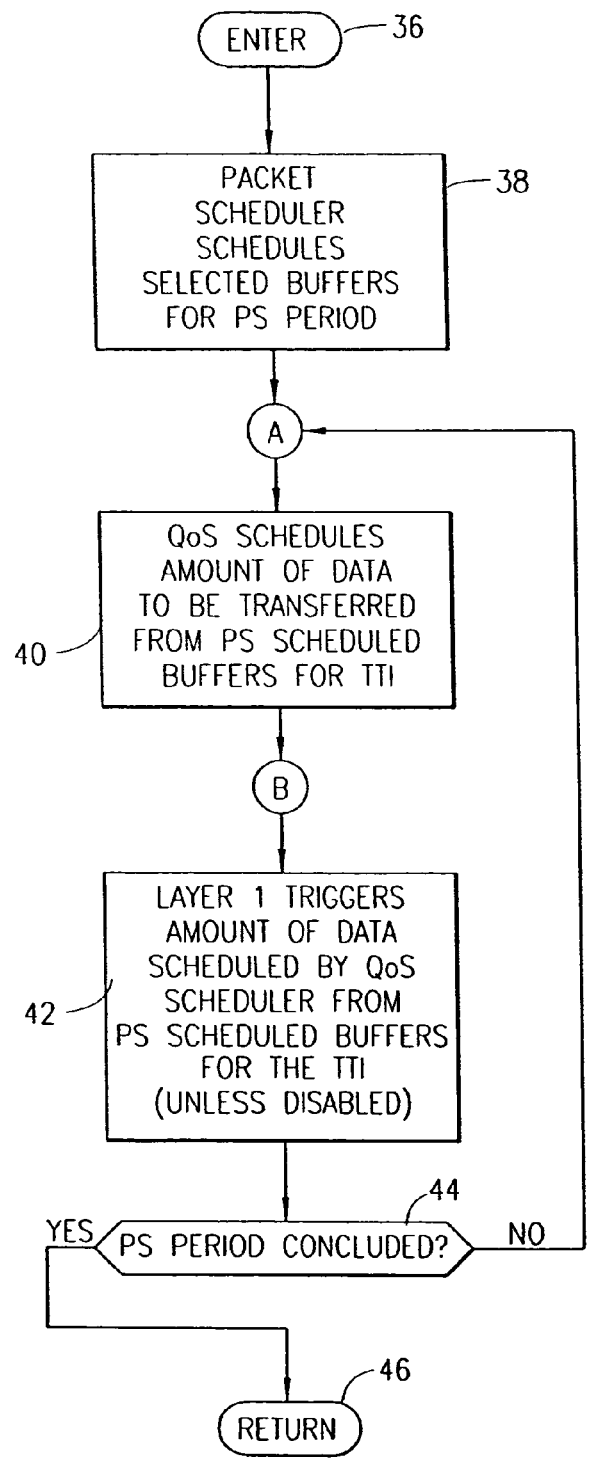
FIG. 9 shows a first QoS mechanism for mapping of IP packets to the radio interface, according to the present invention.

FIG. 9 shows a first QoS mechanism, according to the present invention, for mapping IP packets to the radio interface. FIG. 9 can be best understood in conjunction with FIG. 6, wherein the QoS classifier 16 has already classified incoming packets and stored same in the RLC buffers 20. At this point, after entry in a step 36, it is up to the packet scheduler 22 to schedule, as indicated in a step 38, selected RLC buffers for data transfer during its next packet scheduling period, which comprises a plurality of transmission time intervals (TTIs). Certain buffers may be excluded from participation in data transfer during a given PS period for various reasons, including a poor connection determined for that PS period. Once the packet scheduler 22 has scheduled selected buffers for that PS period, the QoS scheduler 10 then schedules, as shown in a step 40, the amount of data to be transferred from the PS scheduled buffers for the upcoming TTI. The amount of data enabled by the QoS scheduler to be transferred from PS scheduled buffers for each TTI can differ according to various methodologies described in detail in FIGS. 9A-9F, to be described below. After step 40 is executed, layer 1 then triggers the amount of data scheduled by the QoS scheduler from PS scheduled buffers for the TTI in question, as indicated in a step 42. This means that the data is actually read from the buffers and transferred according to a selected transport mechanism by the physical layer over the radio interface Uu.

A determination is made in a step 44 as to whether the packet scheduler period is concluded or not. If not, subsequent TTIs are to be scheduled for the PS period, and the steps 40, 42 and 44 are re-executed repeatedly until a determination is made in a step 44 that the PS period is concluded, after which time a return is made, as indicated in a step 46. A new packet scheduler scheduling period can be then reinitiated, and entry can be executed again by entering at step 36 and repeating the steps shown in FIG. 9.

The amount of data triggered from the buffer can be determined by many ways. Some of the ways reflect directly a QoS impact. Thus it can be considered to be a QoS mechanism. Some alternative embodiments are represented below:

1. Have the QoS scheduler schedule equal amount of data to be triggered from all the buffers as long as there is capacity left. For the next TTI start from the next buffer in cyclical order. There are two alternatives for this, either all the buffers are triggered in circular order, or only those buffers indicated by the Packet Scheduler are triggered for all TTIs of a scheduling period. We know from FIG. 7 that the packet scheduler can, for instance, prohibit packet transfers entirely for a given terminal during a selected packet scheduling period. The Packet Scheduler then has to decide which buffers to be activated for the scheduling period. The operation of the packet scheduler is known and is based on the noise rise calculation in the uplink and on the transmitted base station power in the downlink. It should also be realized that the packet scheduler can prohibit transfers from a particular buffer or buffers among a plurality of buffers associated with a single terminal. The flow graph in FIG. 8 represents this situation. The oval marked buffers indicated along the line 24 are selected by the Packet Scheduler to be triggered during that TTI. (The Packet Scheduler enabling lasts for several TTIs.) All the I buffers are triggered in sequential order. When the capacity limit is reached, a change is made to the next TTI triggering period and the process is continued in a cyclical order. The amount of PDUs triggered from each buffer is constant i.e., $k_1 = \ldots = k_i = k_{i+1} = k_I$ for $\forall$ i=0 ... I.

Here are two different interpretations: either the number of bytes triggered is equal i.e., if the PDU size is equal, or the number of PDUs triggered is equal, but the PDU size may be different i.e., the amount of data in bytes unit is different.

Figure 9A:
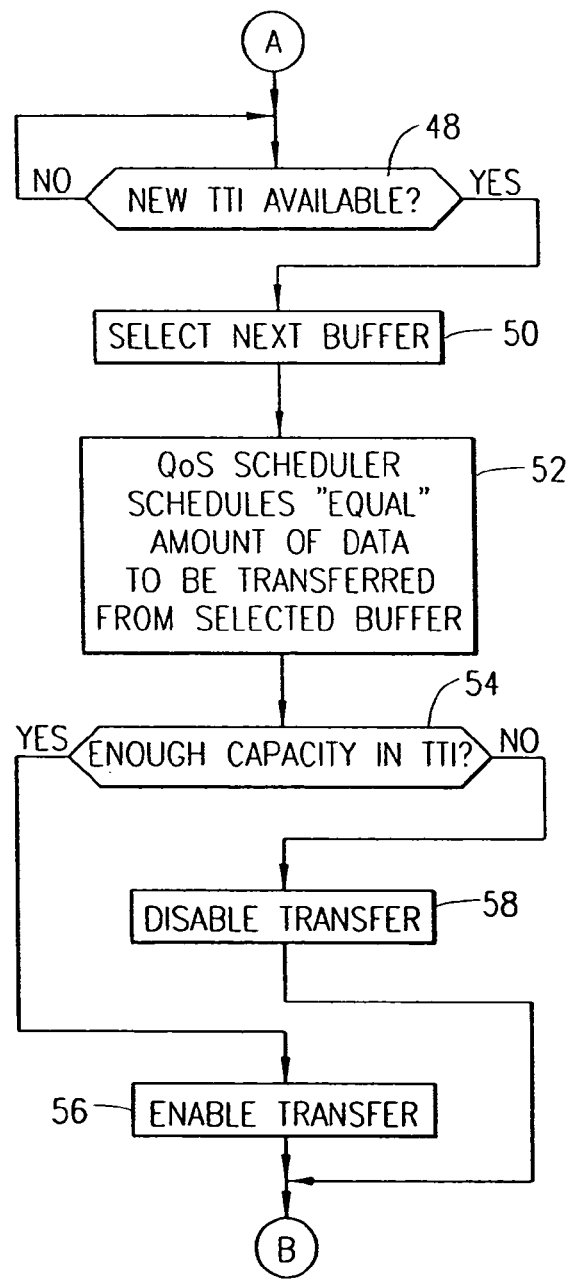
FIG. 9A shows the QoS scheduler scheduling equal amounts of data to be transferred from PS scheduled buffers for a given TTI.

Referring back to FIG. 9, and in particular to the details of step 40, as shown in FIG. 9A, the above methodology can be viewed as a series of steps starting with a determination as shown in a step 48 as to whether a new TTI is available for QoS scheduling or not. If so, a next buffer is selected, as indicated in a step 50. The QoS scheduler 10 of FIG. 6 then schedules in a step 52 "equal" (as interpreted above) amounts of data to be transferred from the buffer selected in step 50. If there is enough capacity in the new TTI, as determined in a step 54, the transfer is enabled, as indicated in a step 56, and the layer 1 triggering step 42 of FIG. 9 is executed. If there is not enough capacity in the TTI, a step 58 is then executed instead, and the amount of data scheduled by the QoS scheduler 10 is not transferred by layer 1. Rather, a determination is made in the step 44 of FIG. 9 as to whether the PS period is concluded and, if not, the steps of FIG. 9A are executed again, etc.

2. Divide the overall data amount fitting to the TTI and share this capacity equally for different DCHs (Dedicated Channels). Every RLC buffer is then triggered correspondingly. This scheme is also depicted in FIG. 8. However, in this scheme one PDU is triggered from every buffer at a time as long as capacity is left. When the capacity limit is reached, a change is made to the next TTI.

It is important to notice that the scheduling and data collection happen first on a buffer-by-buffer basis. After the PDUs that will go to the transmission are known, they are processed on L1 "transport channel"-by-"transport channel" before they are multiplexed and the Coded Composite Transport channel is formed.

Figure 9C:
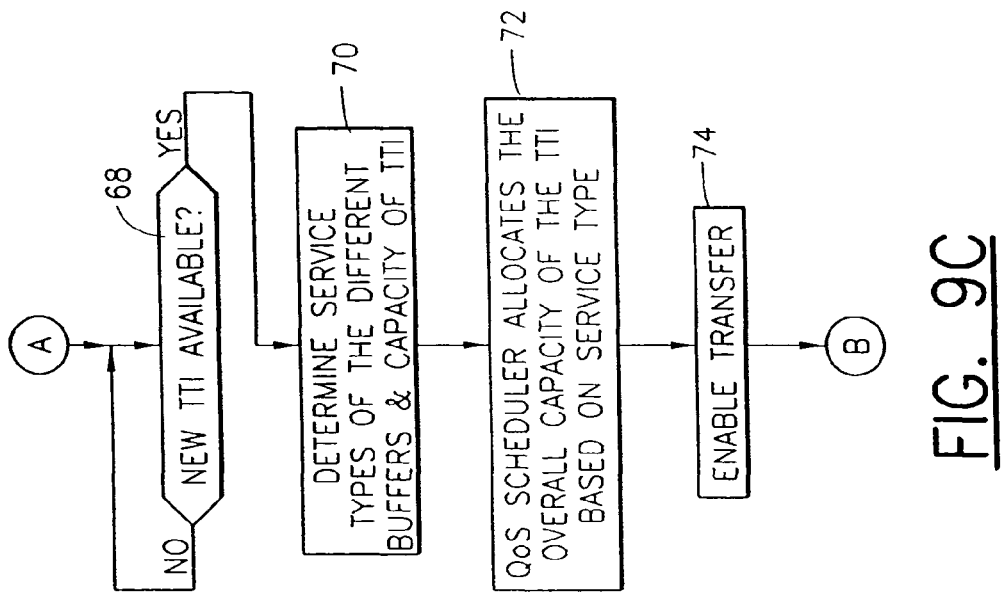
FIG. 9C shows the QoS scheduler allocating the overall capacity of the TTI based on service type, according to the present invention.
Figure 9B:
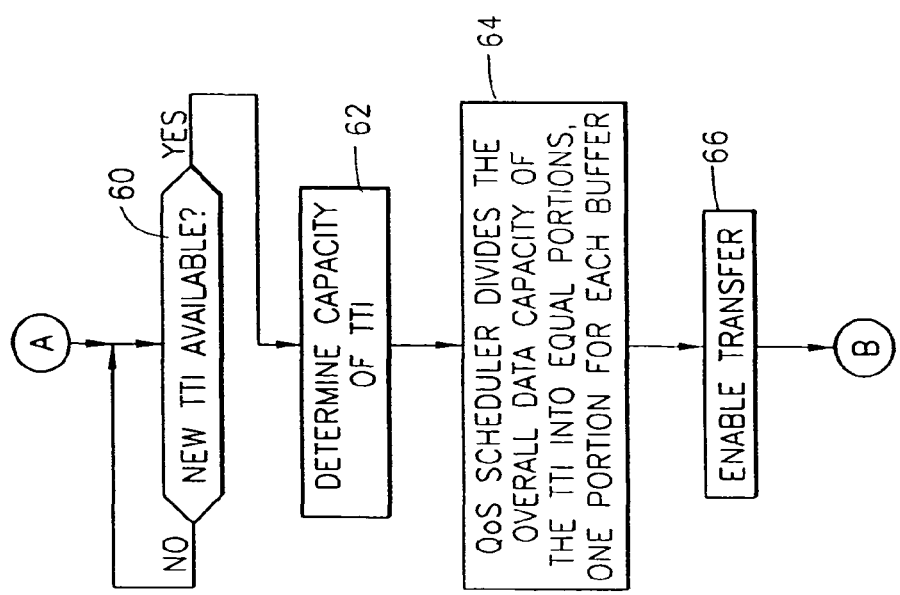
FIG. 9B shows the QoS scheduler dividing the overall data capacity of the TTI into equal portions, one portion for each buffer, according to the present invention.

This methodology is depicted in FIG. 9B, where after execution of the step 38 of FIG. 9, a step 60 is executed to determine if a new TTI is available or not. If so, the capacity of the TTI is determined, as indicated in a step 62. The QoS scheduler of FIG. 6 then divides the overall data capacity of the TTI into equal portions, one portion for each buffer. In this way, the TTI capacity is shared equally for different DCHs. Once enabled by a step 66, as indicated in FIG. 9B, the step 42 of FIG. 9 is executed, and every RLC buffer is then triggered correspondingly.

3. Divide the overall data capacity based on service type present on the DCH. Every RLC buffer is then triggered for the data amount depending on its service type.

This scheme can also be visualized by reference to FIG. 8. Now the amount of PDUs and the size of PDUs is different for every buffer. A different amount of data is triggered from every buffer i.e., both the number of the PDUs triggered is different and the size of the PDUs is different.

FIG. 9C also shows this methodology, wherein after execution of the step 40 of FIG. 9, a step 68 is executed to determine if a new TTI is available or not. If so, the service types of the different buffers are determined, as indicated in a step 70, along with the capacity of the TTI. A step 72 is then executed by the QoS scheduler 10 of FIG. 6 to allocate the overall capacity of the TTI based on the service type determined in the step 70. Transfer is then enabled in a step 70, and step 42 of FIG. 9 is executed, wherein layer 1 triggers the data transfer enabled in a step 74.

4. Measure buffer level in the RLC buffers and trigger amount of data relative to the buffer levels of the other RLC buffers.

Here the Buffer Level measurement affects and changes the number of PDUs triggered from the individual buffers per TTI.

This methodology is depicted in FIG. 9D, wherein after execution of the step 38 of FIG. 9, a step 76 is executed to determine if a new TTI is available or not. If so, the buffer levels are measured according to a step 78, and the capacity of the TTI determined in a step 80. The QoS scheduler 10 of FIG. 6 then divides the overall data capacity of the TTI based on the measured buffer level. For instance, if the buffer level in a particular buffer is higher than the level of the other buffers, the QoS scheduler allocates more of the TTI capacity to that buffer. The transfer is then enabled in a step 84, and the step 42 of FIG. 9 is then executed to trigger the amount of data scheduled by the QoS scheduler for actual transfer on the radio interface.

5. Divide the overall data capacity based on the priority given to the bearers mapped onto the DCH. Every RLC buffer is then triggered the data in the order or priority.

Here the order of triggering is not cyclical, but happens in prioritized order. Also the number of triggered PDUs per buffer is different for different buffers.

FIG. 9E shows this QoS scheduling methodology. After the packet scheduler carries out step 38 of FIG. 9, a step 86 is executed, as indicated in FIG. 9E, to determine if a new TTI is available or not. If so, the priority of each buffer is determined in a step 88, as well as the capacity of the TTI. In a step 90, the QoS scheduler 10 of FIG. 6 then allocates the overall capacity of the TTI based on the priority determined in the step 88. Transfer is then enabled in a step 92, and the step 42 of FIG. 9 is executed, wherein layer 1 triggers the amount of data scheduled by the QoS scheduler.

6. Trigger data amount from the buffers in prioritized sense. Always the first buffer to trigger is the signaling message buffer. The other buffers are triggered in the order of ordered importance. This order of importance can be sorted periodically. The first buffer is the most important, the second buffer is the second most important, etc. The largest data amount is triggered from the first buffer, the second largest data amount from the second buffer and so on. In this way, the highest throughput and the highest importance is given to the first buffer, the second highest importance to the second buffer, and so on.

The method makes it very easy to change the mutual order of importance of the buffers, as it is just a table announcing the order of buffers to trigger. The table can also indicate either the absolute or the relative data amount to trigger from each buffer. The should also be ensured that the assigned transport format set for each DCH has enough flexibility to ensure this data amount based prioritization scheme.

This method is shown in FIG. 9F, wherein after executing the step 38 of FIG. 9, a step 94 is executed to determine if a new TTI is available or not. If so, a buffer priority table as described above is checked in a step 96, and the capacity of the TTI determined. The QoS scheduler 10 of FIG. 6 then allocates the overall capacity of the new TTI to the RLC buffers based on the priority determined from the table, as indicated in a step 98. Transfer is then enabled, as indicated by a step 100, and the step 42 of FIG. 9 executed to actually trigger the amount of data scheduled by the QoS scheduler 10.

QoS Mechanism 2

Another method for QoS realization, according to the present invention, is to make a new use of multiprotocol label switching or other kinds of tagging known for other purposes in fixed network routing. This mechanism adds a label or a tag, which specifies requirements for transmission, to each packet. The labeling or tagging scheme can be applied in the air interface transmission, as these mechanisms can implicitly define the parameters to use in the wireless transmission. These labels and tags can simply map to values or ranges of values to specify the transmission requirements like minimum bandwidth, maximum latency, QoS class or another classification. This can, of course, be done for longer periods of time, for example, for the bearer lifetime in the bearer setup procedure, or it can be done for the bearer lifetime until the next bearer reconfiguration procedure, where new bearer parameters are given. The labeling and tagging scheme, however, makes it possible to indicate each network packet or sequence of network packets independently. It is really not practical to assume bearer reconfiguration for each packet independently.

The label or tag of the incoming packet may be read by the QoS classifier 16 of FIG. 6 and stored in an appropriate RLC buffer among the plurality of RLC buffers 20 of FIG. 6. The packet may then be scheduled by the packet scheduler 22 and the QoS scheduler 10 in the same way as previously described in connection with FIG. 9, and particularly, FIGS. 9C, 9E and 9F, for example.

A teaching hereof is calculation from the labels or tags having time related information (like latency) and value already spent in the fixed packet network. The RNC (or UE) can thus evaluate what are the specifications for the transmission over the air interface.

The calculation from the labels or tags can also be other than time related information. If the bandwidth requirement for a very demanding service is already well fulfilled in the fixed network, it is also possible to favor doing so over the air interface. But if the bandwidth for a service is already lost in the fixed network, it is not necessary to consume more air interface capacity for its transmission trying to use the required high bandwidth. In this case a more reasonable way is just to use the minimum bandwidth over the air interface and send an indication to the network that there would be more radio resources available, but the quality is less than wanted due to the congestion in the fixed network.

Figure 10:
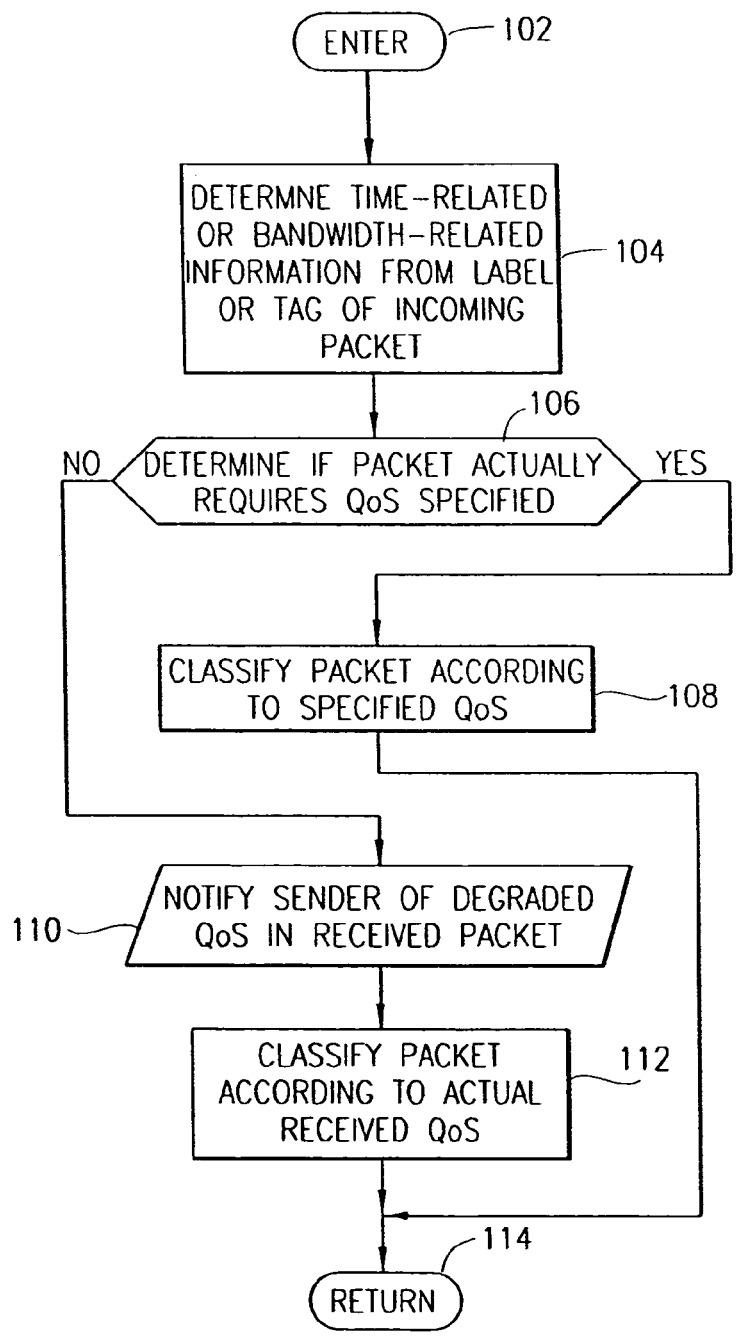
FIG. 10 shows a QoS classification method wherein incoming packets are checked to see if the QoS requested has been actually achieved during transit before entry into a network and, if not, only granting that level of service quality actually being experienced by the packets from that point on, rather than granting the requested QoS.

Referring to FIG. 10, a QoS classification method is shown that can be carried out by the QoS classifier 16 of FIG. 6, for the situation where multiprotocol label switching or tagging is used. As will be evident to anyone of skill in the art, such may be implemented in hardware, software, or some combination thereof. If carried out in software, the method of FIG. 10 could be carried out e.g. by the QoS classifier 16 of FIG. 6 comprising a signal processor executing instructions stored on a non-transitory computer readable medium. After entering in a step 102, a determination is made in a step 104 of time-related, bandwidth-related or the like, quality of service information from the label or tag of the incoming packet or packets. A calculation is made in a step 106 to determine if the packet actually requires the QoS specified. If so, the packet is classified according to the specified QoS, as indicated in a step 108. However, if not, a step 110 is executed to notify the sender of the degraded QoS of the received packet. Since the packet has not actually experienced the desired quality of service in transit through the fixed network, it is unnecessary to waste radio resources by giving it a high level of service quality. Therefore, a step 112 is executed to classify the packet in keeping with the quality of service actually applicable to the received packet. A return is then made in a step 114. The desired quality of service can, of course, be restored on the radio interface for subsequent packets that are received after transmittal through the fixed network with the desired or requested level of quality of service.

Calculation of the new values based on the labels and tags is an enhancement to the means of just interpreting the labeled or tagged values as such. Updating of the labels and tags may need updating of the fields in some network elements also in the fixed network based on reception of the message sent in the step 110 of FIG. 10. However, the RNC node can then finally receive and interpret the label or tag values left for the air interface. Alternatively, the RNC can derive from the label or tag values present in the network packet headers its temporary label and tag values for the air interface.

Figure 11:
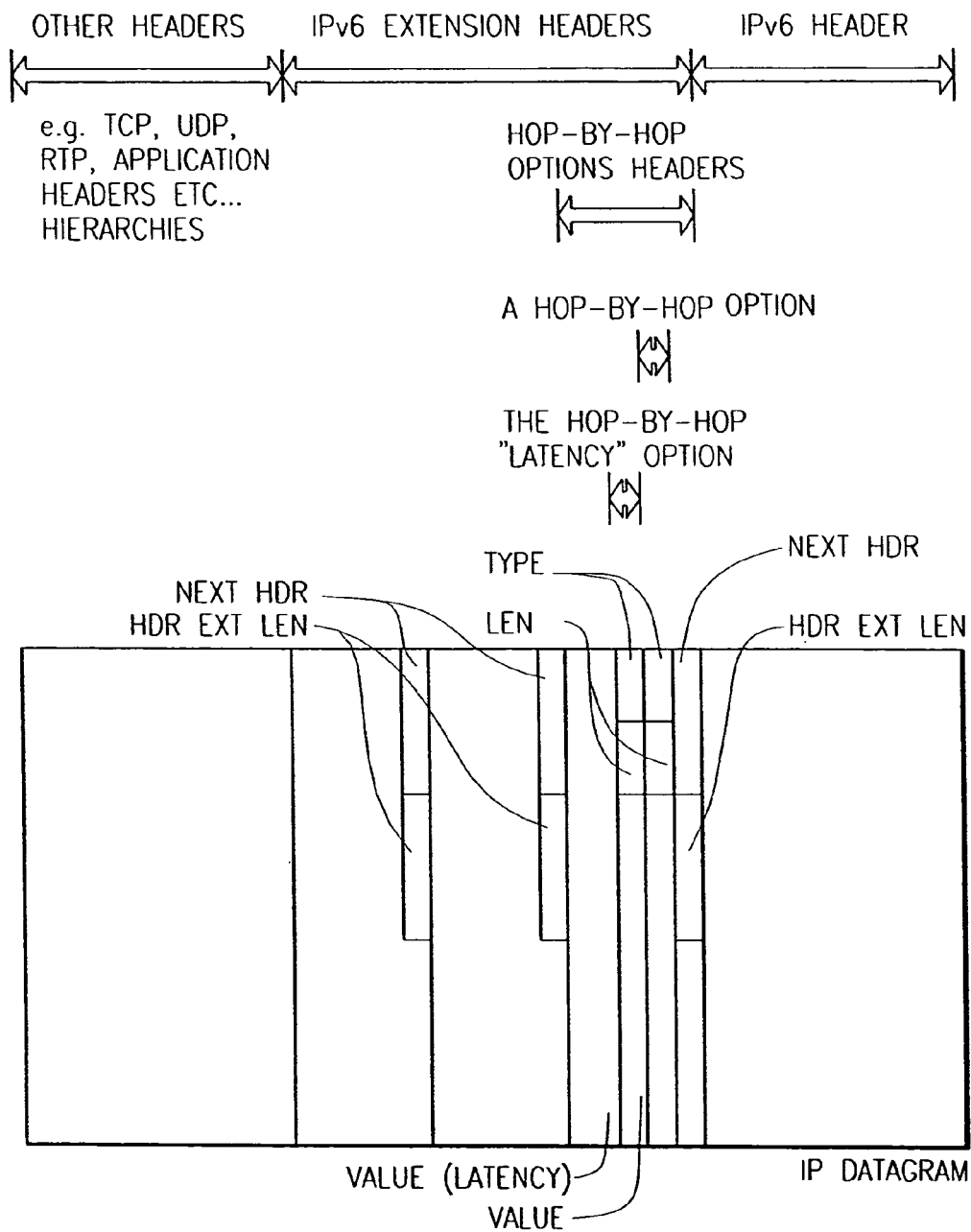
FIG. 11 shows an IPv6 packet utilizing a hop-by-hop extension option as a latency counter, according to the present invention.

For an example, a latency counter could be calculated in the fixed network nodes and over the air interface separately. The RNC could also report a difference between the requested maximum allowed latency and the realized latency time to enable fast transport format set reconfiguration in case of problems. Referring to FIG. 11, such a latency counter can be provided in an extension header of the new IP version 6. For instance, as shown in FIG. 11, an IP packet according to IPv6 includes an IPv6 header, followed by optional IPv6 extension headers, followed by other headers, e.g., PCP, UDP, RTP, application headers, etc. A latency counter could be provided in the Ipv6 packet's hop-by-hop option field, for instance. There is a "next header" field in the Ipv6 header that is used to indicate which header follows the IP header when other applications want to piggyback on the IP header. An IP next header field value of 0 indicates the hop-by-hop option. This is used to provide IP options to every machine the packet passes through. The options included in the hop-by-hop extension have a standard format, as shown in FIG. 11, of a type value, a length and a value. Both the type and length fields are a single byte in length, while the value field's length is variable and indicated by the length byte. One of these can be used for a "latency counter", according to the present invention, as shown in FIG. 11.

This latency counter which will, according to the invention, be present in the IPv6 packet's hop-by-hop option field, will be processed by every router along the way between the end-to-end packet connection, between terminals or between a terminal and a server. The latency counter will announce, how long a time (absolute value or relative value) the packet stayed in the routing queue before being transferred from the input port to the output port. This can be accumulated from hop-to-hop.

The end router for example a wireless router will communicate with the radio network controller, how much time elapsed for the packet to traverse the fixed network and what the bearer requirements are. The RNC will then decide, whether it is still possible to meet the required quality applying to the current radio bearer. If the packet is already outdated it will be discarded and status reports respectively delivered. If there is not a specified out-of-date value available and the packet arrives quite late, it is not necessary to give it high preference to be transferred over the radio interface and it can be placed to the lower priority queue. Still, it may be important that the packet is not discarded but will be delivered to the end terminal later.

With help of the latency counter the RNC can collect information about the traffic flows within the IP packets. It can monitor what constraints have been reached due to the fixed network properties e.g. a congestion situation and which constraints have been reached due to the radio interface, e.g., a high packet loss probability because of bad propagation and bad radio conditions or loading that is too high in that particular radio cell, queues that are too long on the bearers or low capability of the radio bearer settings and Transport Format settings. The means of reacting in the RNC will then vary depending on each case.

In some cases, it will be enough to change the bearer settings or just to add more appropriate Transport Formats to the selectable Transport Format Set, or to change the protection or the like. Other problems may require heavier tuning of the radio network parameters, e.g., allocating more capacity to a particular radio cell, changing of handover (soft handover and hard handover) windows and margins, changing load control or admission control thresholds, etc.

Referring back to FIG. 11, for the hop-by-hop option, the IPv6 specification says that IPv6 must accept and attempt to process extension headers in the order and occuring any number of times in the same packet, except for the hop-by-hop option, which is restricted to appear immediately after the IPv6 header only.

The IPv6 specification further says that the hop-by-hop options header is used to carry optional information that must be examined by every node along a packet's delivery path. The hop-by-hop options header has fields for Next Header, Header Extension Length and Options. The options are variable length fields such that the complete header is an integer multiple of 8 octets. It contains one or more TLV (type-length-value)-encoded options.

As for the inventive latency counter, a new latency value can be calculated by every routing node and carried in the hop-by-hop options field. This latency value can be a definable measure so that it can be compared by any node with the QoS requirement indicated by the TrafficClass or FlowLabel fields. These fields may directly indicate a end-to-end latency requirement or another type of quality requirement (delay, throughput, bandwidth) to which the latency counter value may be compared to.

The latency value can be used locally inside one router so that it can analyze how large a portion of the allowed time limits it has consumed. If it recognizes itself to be a bottleneck for some flows, the router should do something to speed up its queuing for those flows, or it should quit being a routing node for those packets.

Finally the wireless routing node and radio network controller will have to balance the performance between the fixed network and the radio network to serve all the packet flows according to their requirements.

This application of the inventive latency counter to the hop-by-hop fields will thus enable tuning of the radio network parameters and radio bearer parameters.

This also enables differentiation of problems and solutions for the performance behavior in the fixed network and radio network, which are inherently different.

The inventive latency counter is not an application dependent timestamp, which typically describes time relation requirement between the packets of an application. The latency counter is a transport dependent timestamp, which indicates queueing delays and elapsed time in the routing queues during the transport in the network. (This timestamp can be compared to the set QoS transport criteria within the traffic class and flow label fields. The QoS requirements are defined by the application.)

The same concept as described above for a latency counter can be applied for others as well, e.g., the minimum required bandwidth. The RNC could report the difference of requested minimum or nominal bandwidth and the realized bandwidth to enable fast transport format set (TFS) reconfiguration in case of problems. The problematic case is, of course, not the case where the data amount to be transmitted is less than the minimum or nominal bandwidth required. It is always possible to select a lower bitrate than the minimum, and it is always possible to select the zero bitrate, if enough data is not available.

The same method is assumed to be suitable also for the mentioned QoS classes and other types of traffic flow classification.

The described scheme can be calculated in the RNC for both traffic directions. In case of transmission from the UE buffers, the RNC has to calculate updates for the label or tag fields. The RNC should allocate the UEs resources so that the latency is not too extensively consumed in the air interface and the bandwidth is not lost already in the air interface. However, the RNC can use the forward type traffic measurements to estimate how large a share of the latency can be consumed in the UE and how much bandwidth at least has to be provided by the UE to ensure end-to-end satisfaction. It can be assumed that the portion of consumption in the air interface compared to the consumption in the fixed network is comparable for the reverse link than for the forward link, if the requirements are the same. Again it can be assumed that the bandwidth provided behaves the same way between the forward and the reverse traffic.

There are, of course, a number of cases where the requirements for latency, bandwidth, QoS class and traffic flow classifications are clearly different for the forward and reverse traffic. In this case the forward traffic cannot directly enable derivation of the reverse traffic parameters.

Therefore, the invention should be viewed as capable of being used or executed on either the uplink or downlink and on either side of the air interface. In fact, it can be viewed as useable simply as between a first network and a second network or between parts of the same network.

Figure 12:
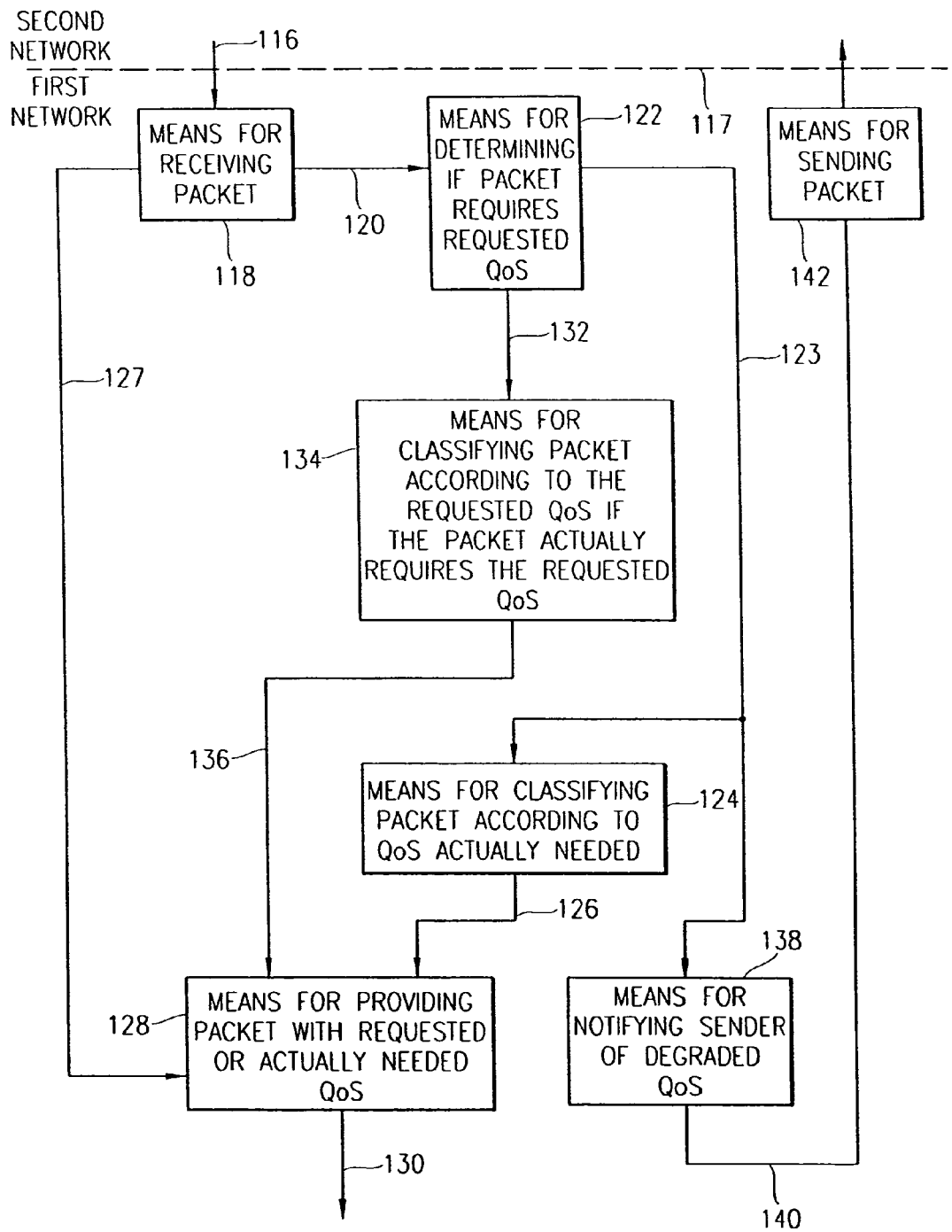
FIG. 12 shows an apparatus for carrying out the method of FIG. 10.

Referring now to FIG. 12, an apparatus for carrying out the QoS classification method of FIG. 10 is shown. It should be realized that the method is applicable in any interface along an end-to-end path traversed by a packet or packets. Such is shown generally in FIG. 12, where a packet or packets on a signal line 116 are shown leaving a second network and entering a first network over an interface 117. The packets are received by means 118, which may also determine the level of service requested by the packet in its traversal of the end-to-end path. It may also include means for determining the actual level of service experienced by the packet or packets during such traversal over the path so far traversed from the point of origination to the interface 117. This information about the requested QoS and the actually experienced QoS may be provided on a signal line 120 to a means 122 for determining if the packet or packets require the requested QoS. This may be done by a simple comparison of the information provided by the means 118. If the comparison carried out by the means 122 determines that the packet or packets do not actually require the requested QoS because they have not actually experienced that level of service up to this point, then it is unnecessary to grant that level of requested QoS. Therefore, a signal is provided on a line 123 indicating that the comparison has found that only a certain degraded level of service is required for the incoming packet or packets. This information is provided to a means 124 for classifying the packet or packets according to the QoS actually needed, as indicated by the signal on the line 123. Once classified, the means 124 provides a signal on a line 126 indicating the level of service that should be granted to the packet or packets. The means for receiving the packet or packets can, for instance, provide the packets incoming on the line 116 on a line 127 to a means 128 for providing the packet or packets on a line 130 with the level of service actually needed, as indicated by the signal on the line 126.

On the other hand, if the means 122 determined that the packet or packets require the requested QoS because they have been experiencing that level of service in transit from the source to the interface 117, then a signal on a line 132 is provided to a means 134 for classifying the packet according to the requested level of QoS. The level of QoS that the first network is able to provide, according to the requested QoS, is signaled on a line 136 to the means 128, which in turn passes the packets onward in the first network towards the terminus of the end-to-end path on the line 130 with full level of the requested QoS.

It should be mentioned that the signal on the line 123 can also be provided to a means 138 for notifying the sender of a degraded level of QoS actually being experienced by the packets that he is sending. This can be signaled on a line 140 to a means 142 for actually sending the notification packets back to the source end of the path.

It should be realized that the apparatus shown in FIG. 12 can be used in a bidirectional manner. For instance, in a wireless application, where the second network might be a public switched telephone network and the first network might be a wireless network, the incoming packets on the line 116 may be destined for a downlink to a mobile terminal. However, as mentioned previously, it could be equally applicable and useful for a wireless uplink where the second network is a wireless network and the first network is a public switched telephone network.

The invention claimed is:

1. A method, comprising
receiving in a network element one or more packets from a source for transmission from said network element to a terminal, said one or more packets having a requested quality-of-service,
determining at said network element if said one or more packets actually experienced said requested quality-of-service in transmission from said source to said network element, and
providing said one or more packets or subsequent packets from said network element to said terminal with said requested quality-of-service if said one or more packets actually experienced said requested quality-of-service in said transmission from said source to said network element, but if said one or more packets actually experienced a quality-of-service degraded from said requested quality-of-service, providing said one or more packets or said subsequent packets in said transmission from said network element to said terminal with an applicable quality-of-service in keeping with said degraded quality-of-service actually experienced in said transmission from said source to said network element.

2. The method of claim 1, further comprising notifying said source of said degraded quality-of-service actually experienced by said one or more packets.

3. The method of claim 1, wherein said quality-of-service is indicated by time-related, bandwidth-related, quality-of-service class related, or some other class information in a label or tag of said one or more packets or said subsequent packets.

4. The method of claim 1, wherein said transmission from said source to said network element is at least in part over a wired network and said transmission from said network element to said terminal is at least in part over a wireless network.

5. The method of claim 1, wherein said transmission from said source to said network element is at least in part over a wireless network and said transmission from said network element to said terminal is at least in part over a wired network.

6. The method of claim 1, wherein upon receipt of said one or more packets in said terminal, it is determined if said one or more packets actually experienced said requested quality-of-service and a quality of service provided for packets outgoing from said terminal toward said source is adjusted to a quality of service in keeping with said degraded quality of service.

7. The method of claim 4, wherein said quality-of-service is indicated by a quality-of-service differentiator provided to a radio network layer in said wireless network.

8. The method of claim 7, wherein said differentiator is non-dynamic.

9. The method of claim 7, wherein said differentiator is dynamic.

10. The method of claim 7, wherein said differentiator is different for forward and reverse directions.

11. The method of claim 3, further comprising calculating new values of information for updating said label or tag of said one or more packets or said subsequent packets.

12. The method of claim 7, wherein said determining includes calculating latency of said one or more packets over said wired network, over said wireless network, or both.

13. The method of claim 12, wherein said calculated latency is for use in an interne protocol extension header hop-by-hop option field.

14. The method of claim 13, wherein said calculated latency in said hop-by-hop option field is for processing by a routing node.

15. The method of claim 14, wherein said calculated latency is for use in said processing by said routing node in impacting a routing table of said routing node.

16. An apparatus, comprising a processor and memory including computer program code configured to, with the processor, cause the apparatus at least to
 determine at a network element upon receipt of one or more packets having a requested quality-of-service if said requested quality-of-service was actually experienced by said one or more packets from a source over one or more networks toward a terminal,
 provide said one or more packets or subsequent packets with said requested quality-of-service from said network element toward said terminal if said one or more packets actually experienced said requested quality-of-service from said source to said network element, but if said one or more packets actually experienced a quality-of-service degraded from said requested quality-of-service,
 provide said one or more packets or said subsequent packets from said network element toward said terminal with an applicable quality-of-service in keeping with said degraded quality-of-service actually experienced by said one or more packets.

17. The apparatus of claim 16, said memory and computer program code configured to, with the processor, cause the apparatus to notify said source of said degraded quality-of-service actually experienced by said one or more packets.

18. The apparatus of claim 16, wherein said quality-of-service is indicated by time-related, bandwidth-related, quality-of-service class related, or some other class information in a label or tag of said one or more packets or said subsequent packets.

19. The apparatus of claim 16, wherein said one or more networks include a wireless network and a wired network.

20. The apparatus of claim 16, wherein said memory and computer program code is configured to, with the processor, cause the apparatus to receive a notification signal from said terminal if the terminal is configured to determine if said one or more packets actually experienced said requested quality-of-service over said one or more networks.

21. The apparatus of claim 19, wherein said quality-of-service is indicated by a quality-of-service differentiator provided to a radio network layer in said wireless network.

22. The apparatus of claim 21, wherein said differentiator is non-dynamic.

23. The apparatus of claim 21, wherein said differentiator is dynamic.

24. The apparatus of claim 21, wherein said differentiator is different for forward and reverse traffic.

25. The apparatus of claim 18, said memory and computer program code configured, with the processor, cause the apparatus to calculate new values of information for updating said label or tag of said one or more packets or said subsequent packets.

26. The apparatus of claim 21, said memory and computer program code configured, with the processor, cause the apparatus to calculate latency of said one or more packets over said wired network, over said wireless network, or both.

27. The apparatus of claim 26, wherein said calculated latency is for use in an interne protocol extension header hop-by-hop option field.

28. The apparatus of claim 27, wherein said calculated latency in said hop-to-hop option field is for processing by a routing node.

29. The apparatus of claim 28, wherein said calculated latency is for use in said processing by said routing node in revising a routing table of said routing node.

30. A non-transitory computer readable medium having a computer program stored thereon for executing a method comprising:
 sending data by a sending terminal having information indicative of time-related, bandwidth-related, or class-related quality-of-service requested for said sending said data such that a receiving terminal, or any network element processing said data sent over a network or a plurality of interconnected networks, is able to determine whether said requested quality-of-service is actually uniformly experienced by said data in traversing said network or said plurality of interconnected networks and,
 when said actually experienced quality-of-service is degraded from said requested quality-of-service in any section of said network or said plurality of interconnected networks, said receiving terminal or said any network element causing said network or said plurality of interconnected networks to uniformly allocate to said data, in traversing said network or said plurality of interconnected networks between said sending and receiving terminals, a degraded quality-of-service corresponding to that actually experienced, or
 said receiving terminal or said any network element causing said network or said plurality of interconnected networks to actually uniformly provide said requested quality-of-service between said sending and receiving terminals by improving said processing of said data over said network or said plurality of interconnected networks.

31. The non-transitory computer readable medium of claim 30 wherein said information is indicative of a notification by said receiving terminal or by said any network element of said degraded quality-of-service actually experienced by said data in traversing said network or said plurality of interconnected networks.

32. The non-transitory computer readable medium of claim 30, wherein said quality-of-service is indicated in a label or tag.

33. The non-transitory computer readable medium of claim 30, wherein said plurality of interconnected networks include at least a wireless network and a wired network.

34. The non-transitory computer readable medium of claim 33, wherein said quality-of-service is indicated by a quality-of-service differentiator provided to a radio network layer in said wireless network.

35. The non-transitory computer readable medium of claim 34, wherein said differentiator is non-dynamic.

36. The non-transitory computer readable medium of claim 34, wherein said differentiator is dynamic.

37. The non-transitory computer readable medium of claim 34, wherein said differentiator is different for forward and reverse traffic.

38. The non-transitory computer readable medium of claim 30, wherein said data is susceptible to processing for determining latency of said data in traversing said network or said plurality of interconnected networks.

39. The non-transitory computer readable medium of claim 38, wherein a determined latency is for use in an internet protocol extension header hop-by-hop option field of said data structure.

40. The non-transitory computer readable medium of claim 39, wherein said determined latency in said hop-by-hop option field is for processing by a network element comprising a routing node.

41. The non-transitory computer readable medium of claim 40, wherein said determined latency is for use in said processing by said routing node in altering a routing table of said routing node.

42. A non-transitory computer readable medium having a computer program stored thereon for carrying out the steps of claim 1 executed on said network element.

43. An apparatus comprising a processor and said computer program provisioned on a computer readable medium according to claim 42.

44. An apparatus, comprising means for receiving in a network element one or more packets from a source for transmission from said network element to a terminal, said one or more packets having a requested quality-of-service, means for determining at said network element if said one or more packets actually experienced said requested quality-of-service in transmission from said source to said network element, and means for providing said one or more packets or subsequent packets from said network element to said terminal with said requested quality-of-service if said one or more packets actually experienced said requested quality-of-service in said transmission from said source to said network element, but if said one or more packets actually experienced a quality-of-service degraded from said requested quality-of-service, providing said one or more packets or said subsequent packets in said transmission from said network element to said terminal with an applicable quality-of-service in keeping with said degraded quality-of-service actually experienced in said transmission from said source to said network element.

* * * * *

UNITED STATES PATENT AND TRADEMARK OFFICE
CERTIFICATE OF CORRECTION

| | | |
|---|---|---|
| PATENT NO. | : 7,782,872 B2 | Page 1 of 1 |
| APPLICATION NO. | : 11/039369 | |
| DATED | : August 24, 2010 | |
| INVENTOR(S) | : Mika Rinne | |

It is certified that error appears in the above-identified patent and that said Letters Patent is hereby corrected as shown below:

In column 19, line 10 (claim 13, line 2), "interne" should be --internet--.

In column 20, line 9 (claim 27, line 2), "interne" should be --internet--.

In column 20, line 12 (claim 28, line 2), "hop-to-hop" should be --hop-by-hop--.

Signed and Sealed this
Nineteenth Day of April, 2011

David J. Kappos
*Director of the United States Patent and Trademark Office*